(12) United States Patent
Popovich et al.

(10) Patent No.: US 6,426,811 B1
(45) Date of Patent: *Jul. 30, 2002

(54) SWITCHABLE HOLOGRAPHIC OPTICAL SYSTEM

(75) Inventors: Milan M. Popovich, Leicester (GB); Michael R. Adams, Mountain View; Jonathan D. Waldern, Los Altos Hills, both of CA (US)

(73) Assignee: DigiLens, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/366,443

(22) Filed: Aug. 3, 1999

Related U.S. Application Data

(63) Continuation-in-part of application No. 09/313,431, filed on May 17, 1999, now abandoned
(60) Provisional application No. 60/092,034, filed on Jul. 8, 1998.

(51) Int. Cl.$^7$ .............................. G02B 5/32; G03H 1/00; F21V 9/00; G09G 3/00
(52) U.S. Cl. .............................. 359/15; 359/13; 359/19; 359/1; 252/582; 345/32
(58) Field of Search ................................ 359/2, 13, 15, 359/22, 30, 19; 369/103; 235/462.45, 472.01; 252/582; 345/32

(56) References Cited

U.S. PATENT DOCUMENTS

| | | | |
|---|---|---|---|
| 4,891,152 A | | 1/1990 | Miller et al. |
| 5,745,203 A | | 4/1998 | Valliath et al. |
| 5,942,157 A | * | 8/1999 | Sutherland et al. ........... 359/15 |
| 6,026,095 A | * | 3/2000 | Seo ........................ 325/472.01 |

FOREIGN PATENT DOCUMENTS

| | | |
|---|---|---|
| EP | 0 856 766 | 8/1998 |
| WO | 97/24645 | 7/1997 |
| WO | 98/04650 | 2/1998 |

OTHER PUBLICATIONS

Tanaka et al., "Holographically formed liquid–crystal/polymer device for reflective color display," Journal of the Society for Information Display, vol. 2, No. 1, Apr. 1994, pp. 37–40.

Chien et al., "Smart Materials for Polymer–Stabilized Reflective Cholesteric Displays," SPIE vol. 2716, Feb. 1996, pp. 20–27.

International Search Report, Application No. PCT/US99/15392, mailed Oct. 22, 1999.

* cited by examiner

*Primary Examiner*—Audrey Chang
(74) *Attorney, Agent, or Firm*—Skjerven Morrill LLP

(57) ABSTRACT

An optical system and an imaging and display system using the optical system. The optical system has at least first and second optical elements aligned on a common axis. In one embodiment, each of the first and second optical elements can operate in an active state or in inactive state and comprise a photopolymer and liquid crystal combination. Each of the first and second optical elements is configured to transmit incident light substantially unaltered when each of the first and second optical elements operates in the inactive state. In the active state, however, each of the first and second optical elements does not transmit incident light substantially unaltered. Rather each of the first and second optical elements substantially alters light incident thereon when each of the first and second optical elements operates in the active state.

5 Claims, 20 Drawing Sheets

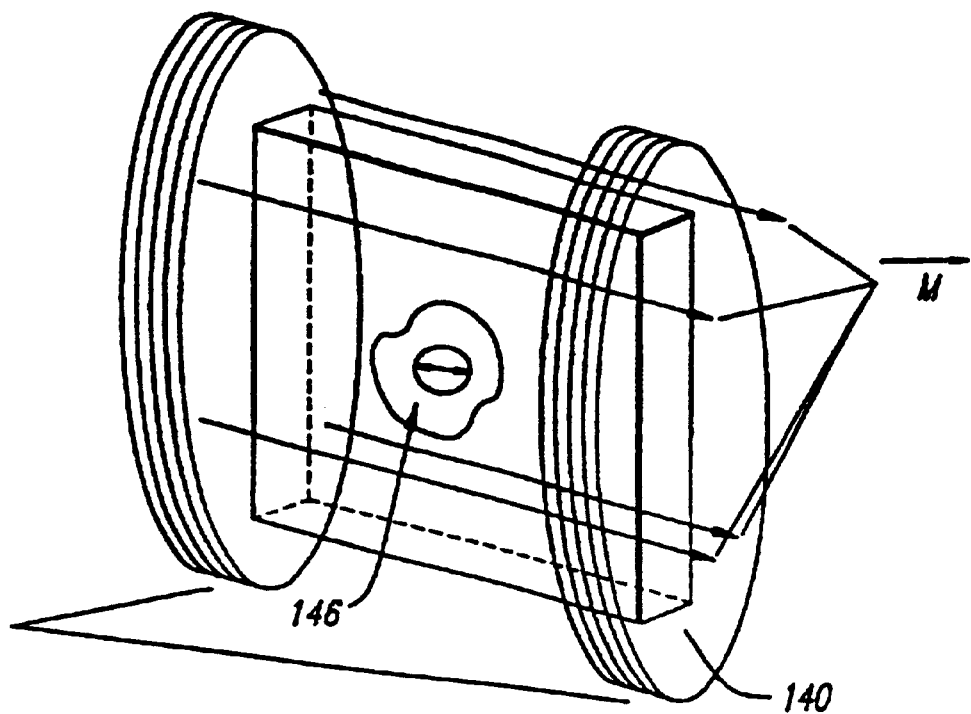
FIG. 10a
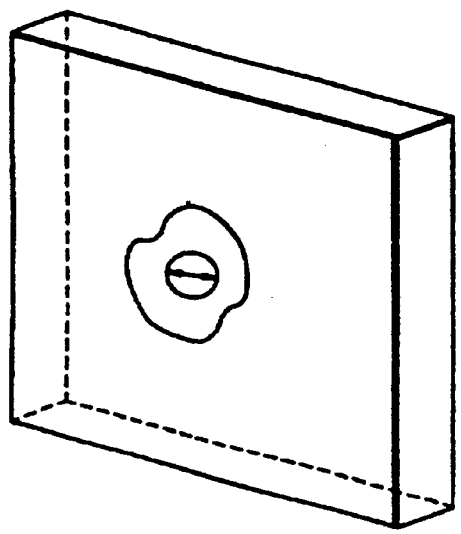
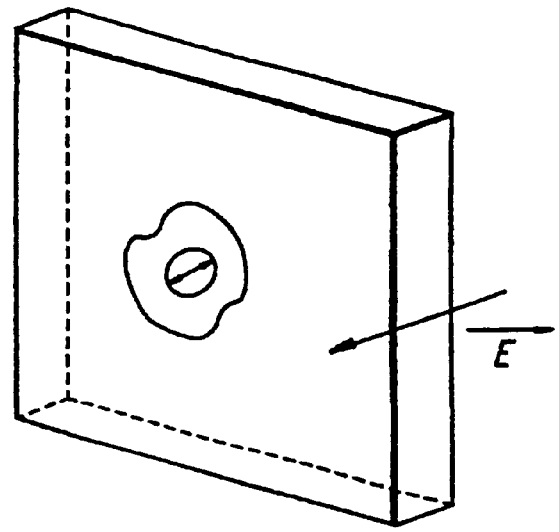
FIG. 10b          FIG. 10c

SLANTED
TRANSMISSION

SLANTED
REFLECTION

LIGHT TRANSMITTED

LIGHT BLOCKED

TRANSMITTED

RETRO-REFLECTED

UNSWITCHED STATE

SWITCHED STATE

SWITCHABLE HOLOGRAPHIC OPTICAL SYSTEM

RELATED APPLICATIONS

This application is a continuation-in-part of U.S. application Ser. No. 09/313,431, now abandoned, filed on May 17, 1999.

This application claims priority to provisional application entitled HOLOGRAPHIC INTEGRATED DISPLAY AND IMAGING SYSTEM, Ser. No. 60/092,034, filed Jul. 8, 1998.

BACKGROUND OF THE INVENTION

1. Field of the Invention

The present invention relates to optical elements, and more particularly to switchable holographic elements for use in imaging and display systems.

2. Description of the Relevant Art

Imaging and display systems are well known in the art. Imaging and display systems are often employed as, for example, night vision systems for military and avionic applications (i.e., wearable night vision devices combining infrared imagery with displayed symbology), camcorder view finders, telepresence (or augmented reality) and ultraviolet sensitive systems for document security applications. In essence, the systems operate by sensing image light from an external scene using, for example, an array of light detectors. The sensed light is converted by the detectors into corresponding electrical signals which in turn are processed on a frame by frame basis to remove artifacts or otherwise improve signal quality. The processed signals are ultimately provided to a light source which generates display light in accordance thereto for subsequent viewing by a user.

Many prior art imaging and display systems employ optical systems that include conventional optical components, such as glass lenses to focus image light onto an array of light detectors. Conventional optical components tend to be large, bulky, and complex. As a result, typical optical systems employing conventional optical components tend to be large, bulky, and complex. The complexity and size of prior art imaging and display systems open times is directly related to the number of optical elements employed therein. For example, night vision systems may employ an optical system having separate optical elements optimized for different bands of wavelength or different magnifications. One optical element in night vision systems may be employed to focus infrared image light while another optical element is employed to focus monochrome display light. Conflicting field of view requirements also contribute to the size and complexity of prior art imaging and display systems. Further, the radically different requirements between imaging and display systems generally requires optical systems contained therein to be radically different.

SUMMARY OF THE INVENTION

The problems outlined above are in large part solved by an optical system having at least first and second optical elements aligned on a common axis. In one embodiment, each of the first and second optical elements can operate in an active state or in inactive state and are formed from a polymer dispersed liquid crystal material. Each of the first and second optical elements is configured to transmit incident light substantially unaltered when each of the first and second optical elements operates in the inactive state. In the active state, however, each of the first and second optical elements does not transmit incident light substantially unaltered. Rather each of the first and second optical elements substantially alters light incident thereon when each of the first and second optical elements operates in the active state.

In one embodiment, the first optical element operating in the active state alters light incident thereon by converging it to a focal surface in space. Additionally, the first optical element may operate in the active state to alter incident light thereon by passing only a select wavelength band thereof. In one embodiment, the second optical element may have the same properties as the first optical element. Alternatively, the second optical element may have different properties so that in the active state, the second optical element substantially alters incident light thereon by reflecting it. Additionally, the second optical element may operate in the active state to substantially alter light incident thereon by reflecting a select wavelength band thereof.

The first and second optical elements in one embodiment are selectively coupled to a voltage source. In this embodiment, the first optical element operates in the inactive state and transmits light substantially unaltered when the first optical element is coupled to a voltage source. In contrast, when the first optical element is decoupled to the voltage source, the first optical element operates in the active state and substantially alters light incident thereon. In this embodiment, the second optical element when coupled to the voltage source operates in the inactive state and simply transmits light incident thereon substantially unaltered. In contrast, when the second optical element is decoupled from the voltage source, the second optical element operates in the active state and acts to substantially light incident thereon. Thus, it can be said that when the first and second optical elements are decoupled from the voltage source, the first and second optical elements operate substantially similar to conventional optical elements. However, when the first and second optical elements are decoupled from the voltage source, their optical properties (passing selecting bandwidths of light, converging light incident thereon, etc.) are erased.

The optical system set forth above may be employed in an imaging and display system including a sensor array, a first processing circuit for processing signals generated by the sensor array, and a light source for generating display light in accordance with signals output by the first processing circuit. In one embodiment, the first optical element operating in the active state converges light incident thereon. This converged light transmits through the second optical element unaltered when the second optical element is in the inactive state. The sensor array receives the converged light and generates a plurality of signals representative thereof. These signals are provided to the first processing circuit where there are processed, for example, to remove noise components therein. The process signals are subsequently provided to the light source which, in turn, generates display light in response thereto. This display light may be provided to the second optical element where it is reflected for viewing by a user of the system after being transmitted substantially unaltered through the first optical element operating in the inactive state.

BRIEF DESCRIPTION OF THE DRAWINGS

Other objects and advantages of the invention will become apparent upon reading the following detailed description and upon reference to the accompanying drawings in which:

FIG. 10a is an elevational view of a reflection grating, made in accordance with the teachings of the description herein, disposed within a magnetic field generated by Helmholtz coils;

FIGS. 10b and 10c are elevational views of the reflection grating of FIG. 10a in the absence of an electric field (FIG. 10b) and with an electric field applied (FIG. 10c);

Figure 1:
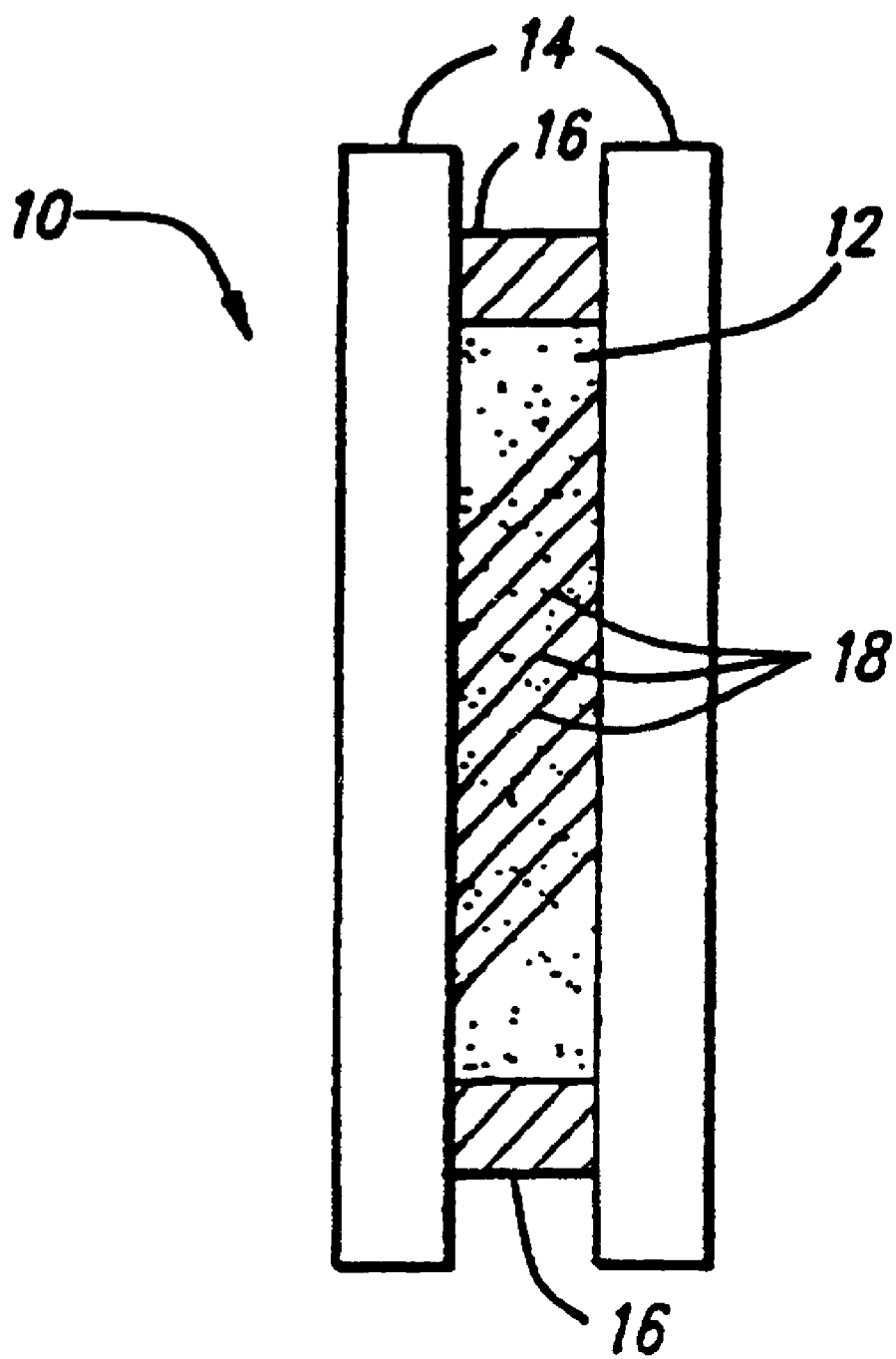
FIG. 1 is a cross-sectional view of an electrically switchable hologram made of an exposed polymer dispersed liquid crystal (PDLC) material made in accordance with the teachings of the description herein.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

1. Switchable Hologram Materials and Devices

The present invention employs holographic optical elements formed, in one embodiment, from a polymer dispersed liquid crystal (PDLC) material comprising a monomer, a dispersed liquid crystal, a cross-linking monomer, a coinitiator and a photoinitiator dye. These PDLC materials exhibit clear and orderly separation of the liquid crystal and cured polymer, whereby the PDLC material advantageously provides high quality optical elements. The PDLC materials used in the holographic optical elements may be formed in a single step. The holographic optical elements may also use a unique photopolymerizable prepolymer material that permits in situ control over characteristics of resulting gratings, such as domain size, shape, density, ordering and the like. Furthermore, methods and materials taught herein can be used to prepare PDLC materials for optical elements comprising switchable transmission or reflection type holographic gratings.

Polymer dispersed liquid crystal materials, methods, and devices contemplated for use in the present invention are also described in R. L. Sutherland et al., "Bragg Gratings in an Acrylate Polymer Consisting of Periodic Polymer dispersed Liquid-Crystal Planes," *Chemistry of Materials*, No. 5, pp. 1533–1538 (1993); in R. L. Sutherland et al., "Electrically switchable volume gratings in polymer dispersed liquid crystals," *Applied Physics Letters*, Vol. 64, No. 9, pp. 1074–1076 (1994); and T. J. Bunning et al., "The Morphology and Performance of Holographic Transmission Gratings Recorded in Polymer dispersed Liquid Crystals," *Polymer*, Vol. 36, No. 14, pp. 2699–2708 (1995), all of which are fully incorporated by reference into this Detailed Description. U.S. patent application Ser. Nos. 08/273,436 and U.S. Pat. No. 5,698,343 to Sutherland et al., titled "Switchable Volume Hologram Materials and Devices," and "Laser Wavelength Detection and Energy Dosimetry Badge," respectively, are also incorporated by reference and include background material on the formation of transmission gratings inside volume holograms.

The process by which a hologram for use in one embodiment of the present invention, may be formed is controlled primarily by the choice of components used to prepare the homogeneous starting mixture, and to a lesser extent by the intensity of the incident light pattern. In one embodiment of polymer dispersed liquid crystal (PDLC) material employed in the present invention creates a switchable hologram in a single step. A feature of one embodiment of PDLC material is that illumination by an inhomogeneous, coherent light pattern initiates a patterned, anisotropic diffusion (or counter diffusion) of polymerizable monomer and second phase material, particularly liquid crystal (LC). Thus, alternating well-defined channels of second phase-rich material, separated by well-defined channels of a nearly pure polymer, can be produced in a single-stop process.

The resulting PDLC material may have an anisotropic special distribution of phase-separated LC droplets within the photochemically cured polymer matrix. Prior art PDLC materials made by a single-step process can achieve at best only regions of larger LC bubbles and smaller LC bubbles in a polymer matrix. The large bubble sizes are highly scattering which produces a hazy appearance and multiple ordering diffractions, in contrast to the well-defined first order diffraction and zero order diffraction made possible by the small LC bubbles of one embodiment of PDLC material in well-defined channels of LC-rich material. Reasonably well-defined alternately LC-rich channels and nearly pure polymer channels in a PDLC material are possible by multi-step processes, but such processes do not achieve the precise morphology control over LC droplet size and distribution of sizes and widths of the polymer and LC-rich channels made possible by one embodiment of PDLC material.

The same may be prepared by coating the mixture between two indium-tin-oxide (ITO) coated glass slides separated by spacers of nominally 10–20 $\mu$m thickness. The sample is placed in a conventional holographic recording setup. Gratings are typically recorded using the 488 nm line of an Argon ion laser with intensities of between about 0.1–100 mW/cm$^2$ and typical exposure times of 30–120 seconds. The angle between the two beams is varied to vary the spacing of the intensity peaks mid hence tile resulting grating spacing of the hologram. Photopolymerization is induced by the optical intensity pattern. A more detailed discussion of exemplary recording apparatus can be found in R. L. Sutherland, et al., "Switchable holograms in new photopolymer-liquid crystal composite materials," Society of Photo-Optical Instrumentation Engineers (SPIE), Proceedings Reprint, Volume 2402, reprinted from *Diffractive and Holographic Optics Technology II* (1995), incorporated herein by reference.

The features of the PDLC material are influenced by the components used in the preparation of the homogeneous starting mixture and, to a lesser extent, by the intensity of the incident light pattern. In one embodiment, the prepolymer material comprises a mixture of a photopolymerizable monomer, a second phase material, a photoinitiator dye, a coinitiator, a chain extender (or cross-linker), and, optionally, a surfactant.

In one embodiment, two major components of the prepolymer mixture are the polymerizable monomer and the second phase material, which are preferably completely miscible. Highly functionalized monomers may be preferred because they form densely cross-linked networks which shrink to some extent and to tend to squeeze out the second phase material. As a result, the second phase material is moved anisotropically out of the polymer region and, thereby, separated into well-defined polymer-poor, second phase-rich regions or domains. Highly functionalized monomers may also be preferred because the extensive cross-linking associated with such monomers yields fast kinetics, allowing the hologram to form relatively quickly, whereby the second phase material will exist in domains of less than approximately 0.1 $\mu$m.

Highly functionalized monomers, however, are relatively viscous. As a result, these monomers do not tend to mix well with other materials, and they are difficult to spread into thin films. Accordingly, it is preferable to utilize a mixture of penta-acrylates in combination with di-, tri-, and/or tetra-acrylates in order to optimize both the functionality and viscosity of the prepolymer material. Suitable acrylates, such as triethyleneglycol diacrylate, trimethylolpropane triacrylate, pentaerythritol triacrylate, pentaerythritol tetracrylate, pentaerythritol pentacrylate, and the like can be used. In one embodiment, it has been found that an approximately 1:4 mixture of tri- to penta-acrylate facilitates homogeneous mixing while providing a favorable mixture for forming 10–20 $\mu$m films on the optical plates.

The second phase material of choice is a liquid crystal (LC). This also allows an electro-optical response for the resulting hologram. The concentration of LC employed should be large enough to allow a significant phase separation to occur in the cured sample, but not so large as to make the sample opaque or very hazy. Below about 20% by weight very little phase separation occurs and diffraction efficiencies are low. Above about 35% by weight, the sample becomes highly scattering, reducing both diffraction efficiency and transmission. Samples fabricated with approximately 25% by weight typically yield good diffraction efficiency and optical clarity. In prepolymer mixtures utilizing a surfactant, the concentration of LC may be increased to 35% by weight without loss in optical performance by adjusting the quantity of surfactant. Suitable liquid crystals contemplated for use in the practice of the present invention may include the mixture of cyanobiphenyls marketed as E7 by Merck, 4'-n-pentyl-4-cyanobiphenyl, 4'-n-heptyl-4-cyanobiphenyl, 4'-octaoxy-4-cyanobiphenyl, 4'-pentyl-4-cyanoterphenyl, α-methoxybenzylidene-4'-butylaniline, and the like. Other second phase components are also possible.

The polymer dispersed liquid crystal material employed in the practice of the present invention may be formed from a prepolymer material that is a homogeneous mixture of a polymerizable monomer comprising dipentaaerythritol hydroxypentacrylate (available, for example, from Polysciences, Inc., Warrington, Pa.), approximately 10–40 wt % of the liquid crystal E7 (which is a mixture of cyanobiphenyls marketed as E7 by Merck and also available from BDH Chemicals, Ltd., London, England), the chain-extending monomer N-vinylp-yrrolidinone ("NVP") (available from the Aldrich Chemical Company, Milwaukee, Wis.), coinitiator N-phenylglycine ("NPG") (also available from the Aldrich Chemical Company, Milwaukee, Wis.), and the photoinitiator dye rose bengal ester; (2,4,5,7-tetraiodo-3',4',5',6'-tetrachlorofluorescein-6-acetate ester) marketed as RBAX by Spectragraph, Ltd., Maumee, Ohio). Rose bengal is also available as rose bengal sodium salt (which must be esterified for solubility) from the Aldrich Chemical Company. This system has a very fast curing speed which results in the formation of small liquid crystal micro-droplets.

The mixture of liquid crystal and prepolymer material are homogenized to a viscous solution by suitable means (e.g., ultrasonification) and spread between indium-tin-oxide (ITO) coated glass sides with spacers of nominally 15–100 $\mu$m thickness and, preferably, 10–20 $\mu$m thickness. The ITO is electrically conductive and serves as an optically transparent electrode. Preparation, mixing and transfer of the prepolymer material onto the glass slides are preferably done in the dark as the mixture is extremely sensitive to light.

The sensitivity of the prepolymer materials to light intensity is dependent on the photoinitiator dye and its concentration. A higher dye concentration leads to a higher sensitivity. In most cases, however, the solubility of the photoinitiator dye limits the concentration of the dye and, thus, the sensitivity of the prepolymer material. Nevertheless, it has been found that for more general applications, photoinitiator dye concentrations in the range of 0.2–0.4% by weight are sufficient to achieve desirable sensitivities and allow for a complete bleaching of the dye in the recording process, resulting in colorless final samples. Photoinitiator dyes that may be useful in generating PDLC materials are rose bengal ester (2,4,5,7-tetraiodo-3',4',5',6'-tetrachlorofluorescein-6-acetate ester); rose bengal sodium salt; eosin; eosin sodium salt; 4,5-diiodosuccinyl fluorescein; camphorquinone; methylene blue, and the like. These dyes allow a sensitivity to recording wavelengths across the visible spectrum from nominally 400 nm to 700 nm. Suitable near-infrared dyes, such as cationic cyanine dyes with trialkylborate anions having absorption from 600–900 nm as well as merocyanine dyes derived from spiropyran may also find utility in the present invention.

The coinitiator employed in the practice of the present invention controls the rate of curing in the free radical polymerization reaction of the prepolymer material. Optimum phase separation and, thus, optimum diffraction efficiency in the resulting PDLC material, are a function of curing rate. It has been found that favorable results can be achieved utilizing coinitiator in the range of 2–3% by weight. Suitable coinitiators include N-phenylglycine; triethyl amine; triethanolamine; N,N-dimethyl-2,6-diisopropyl aniline, and the like.

Other suitable dyes and dye coinitiator combinations that may be suitable for use in the present invention, particularly for visible light, include eosin and triethanolamine; camphorquinone and N-phenylglycine; fluorescein and triethanolamine; methylene blue and triethanolamine or N-phenylglycine; erythrosin B and triethanolamine; indolinocarbocyanine and triphenyl borate; iodobenzospiropyran and triethylamine, and the like.

The chain extender (or cross linker) employed in the practice of the present invention may help to increase the solubility of the components in the prepolymer material as well as increase the speed of polymerization. The chain extender is preferably a smaller vinyl monomer as compared with the pentacrylate, whereby it can react with the acrylate positions in the pentacrylate monomer, which are not easily accessible to neighboring pentaacrylate monomers due to steric hindrance. Thus, reaction of the chain extender monomer with the polymer increases the propagation length of the growing polymer and results in high molecular weights. It has been found that chain extender in general applications in the range of 10–18% by weight maximizes the performance in terms of diffraction efficiency. In the one embodiment, it is expected that suitable chain extenders can be selected from the following: N-vinylpyrrolidinone; N-vinyl pyridine; acrylonitrile; N-vinyl carbazole, and the like.

It has been found that the addition of a surfactant material, namely, octanoic acid, in the prepolymer material lowers the switching voltage and also improves the diffraction efficiency. In particular, the switching voltage for PDLC materials containing a surfactant are significantly lower than those of a PDLC material made without the surfactant. While not wishing to be bound by any particular theory, it is believed that these results may be attributed to the weakening of the anchoring forces between the polymer and the phase-separated LC droplets. SEM studies have shown that droplet sizes in PDLC materials including surfactants are reduced to the range of 30–50 nm and the distribution is more homogeneous. Random scattering in such materials is reduced due to the dominance of smaller droplets, thereby increasing the diffraction efficiency. Thus, it is believed that the shape of the droplets becomes more spherical in the presence of surfactant, thereby contributing to the decrease in switching voltage.

For more general applications, it has been found that samples with as low as 5% by weight of surfactant exhibit a significant reduction in switching voltage. It has also been found that, when optimizing for low switching voltages, the concentration of surfactant may vary up to about 10% by weight (mostly dependent on LC concentration) after which there is a large decrease in diffraction efficiency, as well as an increase in switching voltage (possibly due to a reduction in total phase separation of LC). Suitable surfactants include octanoic acid; heptanoic acid; hexanoic acid; dodecanoic acid; decanoic acid, and the like.

In samples utilizing octanoic acid as the surfactant, it has been observed that the conductivity of the sample is high, presumably owing to the presence of the free carboxyl (COOH) group in the octanoic acid. As a result, the sample increases in temperature when a high frequency (~2 KHz) electrical field is applied for prolonged periods of time. Thus, it is desirable to reduce the high conductivity introduced by the surfactant, without sacrificing the high diffraction efficiency and the low switching voltages. It has been found that suitable electrically switchable gratings can be formed from a polymerizable monomer, vinyl neononanoate ("VN") $C_8H_{17}CO_2CH=CH_2$, commercially available from the Aldrich Chemical Co. in Milwaukee, Wis. Favorable results have also been obtained where the chain extender N-vinylpyrrolidinone ("NVP") and the surfactant octanoic acid are replaced by 6.5% by weight VN. VN also acts as a chain extender due to the presence of the reactive acrylate monomer group. In these variations, high optical quality samples were obtained with about 70% diffraction efficiency, and the resulting gratings could be electrically switched by an applied field of 6V/μm.

PDLC materials used in the present invention may also be formed using a liquid crystalline bifunctional acrylate as the monomer ("LC monomer"). LC monomers have an advantage over conventional acrylate monomers due to their high compatibility with the low molecular weight nematic LC materials, thereby facilitating formation of high concentrations of low molecular weight LC and yielding a sample with high optical quality. The presence of higher concentrations of low molecular weight LCs in the PDLC material greatly lowers the switching voltages (e.g., to ~2V/μm). Another advantage of using LC monomers is that it is possible to apply low AC or DC fields while recording holograms to pre-align the host LC monomers and low molecular weight LC so that a desired orientation and configuration of the nematic directors can be obtained in the LC droplets. The chemical formulate of several suitable LC monomers are as follows:

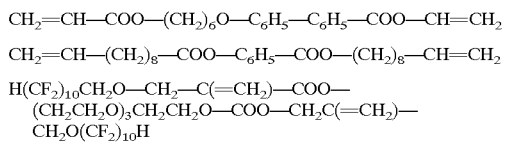

Semifluorinated polymers are known to show weaker anchoring properties and also significantly reduced switching fields. Thus, it is believed that semifluorinated acrylate monomers which are bifunctional and liquid crystalline may find suitable application in the present invention.

Referring now to FIG. 1, there is shown a cross-sectional view of an electrically switchable hologram 10 made of an exposed polymer dispersed liquid crystal material made according to the teachings of this description. A layer 12 of the polymer dispersed liquid crystal material is sandwiched between a pair of indium-tin-oxide coated glass slides 14 and spacers 16. The interior of hologram 10 shows Bragg transmission gratings 18 formed when layer 12 was exposed to an interference pattern from two intersecting beams of coherent laser light. The exposure times and intensities can be varied depending on the diffraction efficiency and liquid crystal domain size desired. Liquid crystal domain size can be controlled by varying the concentrations of photoinitiator, coinitiator and chain-extending (or cross-linking) agent. The orientation of the nematic directors can be controlled while the gratings are being recorded by application of an external electric field across the ITO electrodes.

Figure 2:
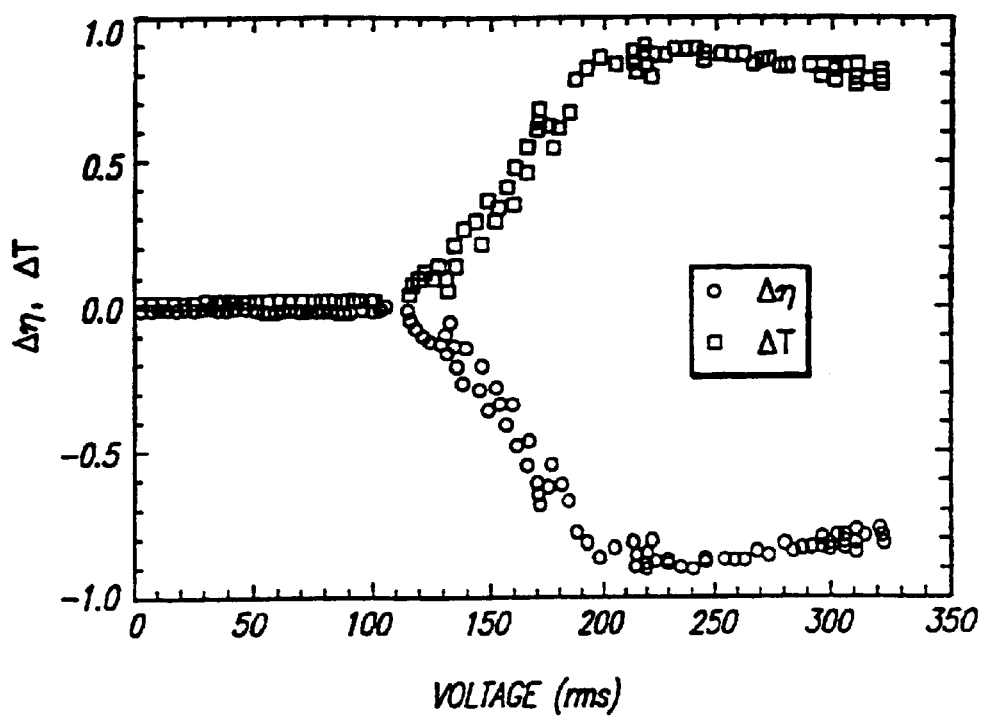
FIG. 2 is a graph of the normalized net transmittance and normalized net diffraction efficiency of a hologram made in accordance with the teachings of the description herein (without the addition of a surfactant) versus the rms voltage applied across the hologram.

The scanning electron micrograph shown in FIG. 2 of the referenced *Applied Physics Letters* article and incorporated herein by reference is of the surface of a grating which was recorded in a sample with a 36 wt % loading of liquid crystal using the 488 nm line of an argon ion laser at an intensity of 95 mW/cm². The size of the liquid crystal domains is about 0.2 μm and the grating spacing is about 0.54 μm. This sample, which is approximately 20 μm thick, diffracts light in the Bragg regime.

FIG. 2 is a graph of the normalized net transmittance and normalized net diffraction efficiency of a hologram made according to the teachings of his disclosure versus the root mean square voltage ("Vrms") applied across the hologram. Δη is the change in first order Bragg diffraction efficiency. ΔT is the change in zero order transmittance. FIG. 2 shows that energy is transferred from the first order beam to the zero-order beam as the voltage is increased. There is a true minimum of the diffraction efficiency at approximately 225 Vrms. The peak diffraction efficiency can approach 100%, depending on the wavelength and polarization of the probe beam, by appropriate adjustment of the sample thickness. The minimum diffraction efficiency can be made to approach 0% by slight adjustment of the parameters of the PDLC material to force the refractive index of the cured polymer to be equal to the ordinary refractive index of the liquid crystal.

Figure 3:
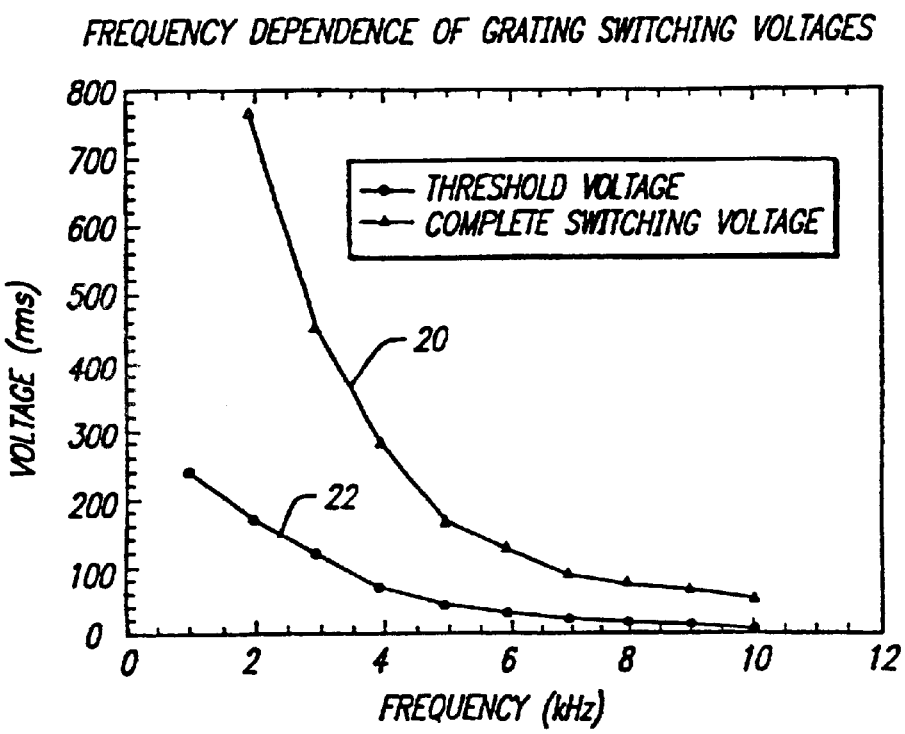
FIG. 3 is a graph of both the threshold and complete switching rms voltages needed for switching a hologram made in accordance with the teachings of the description herein to minimum diffraction efficiency versus the frequency of the rms voltage.

By increasing the frequency of the applied voltage, the switching voltage for minimum diffraction efficiency can be decreased significantly. This is illustrated in FIG. 3, which is a graph of both the threshold rms voltage 20 and the complete switching rms voltage 22 needed for switching a hologram made according to the teachings of this disclosure to minimum diffraction efficiency versus the frequency of the rms voltage. The threshold and complete switching rms voltages are reduced to 20 Vrms and 60 Vrms, respectively, at 10 kHz. Lower values are expected at even higher frequencies.

Figure 4:
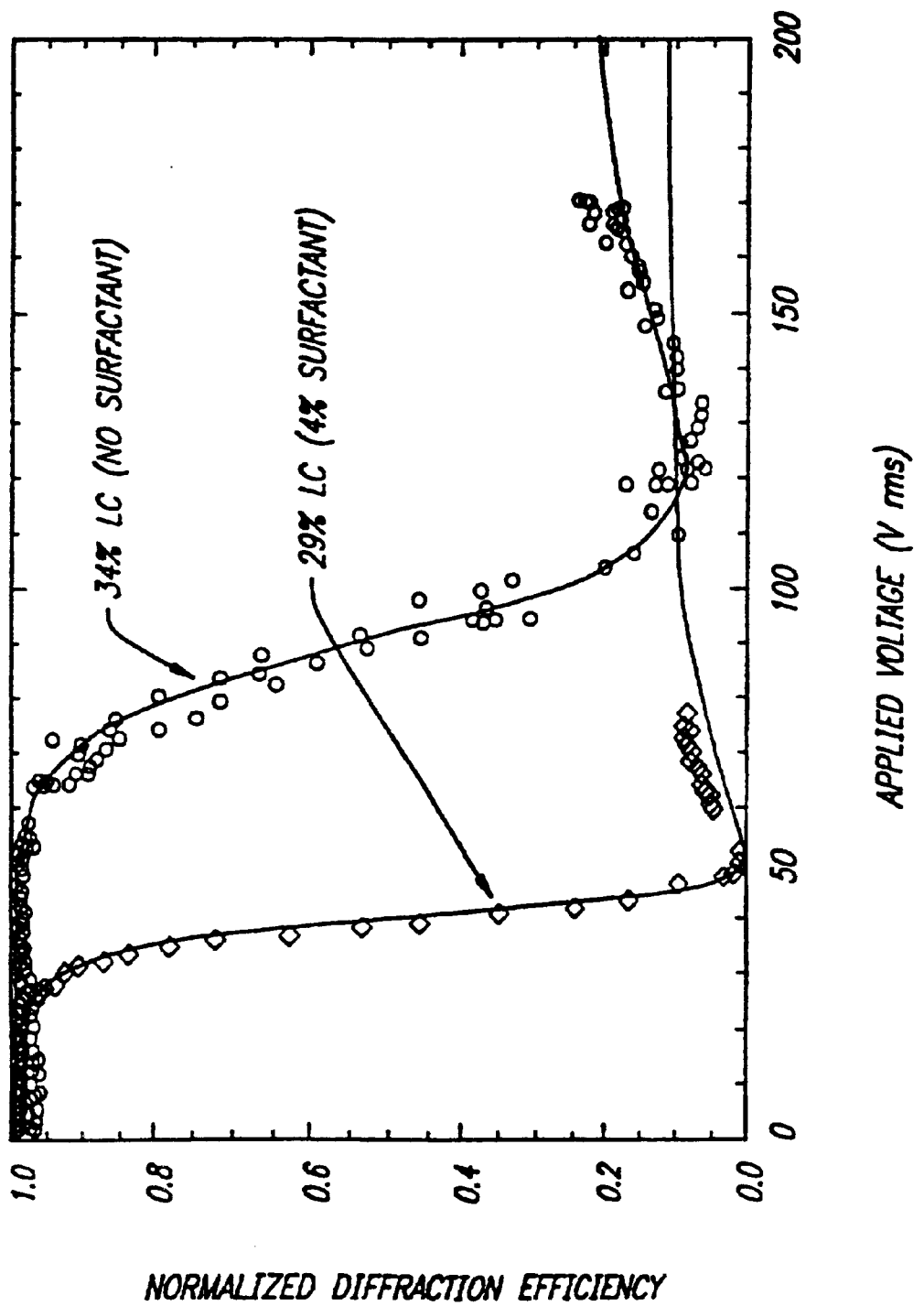
FIG. 4 is a graph of the normalized diffraction efficiency as a function of the applied electric field for a PDLC material formed with 34% by weight liquid crystal surfactant present and a PDLC material formed with 29% by weight liquid crystal and 4% by weight surfactant.
Figure 5:
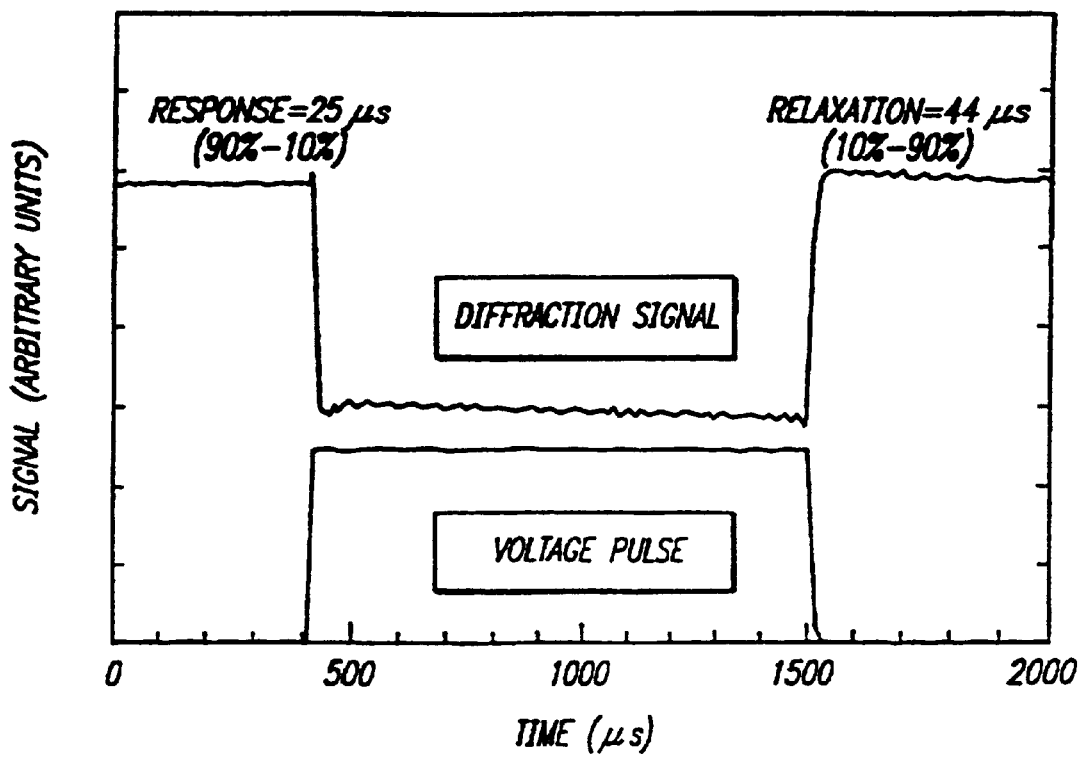
FIG. 5 is a graph showing the switching response time data for the diffracted beam in the surfactant-containing PDLC material in FIG. 4.
Figure 6:
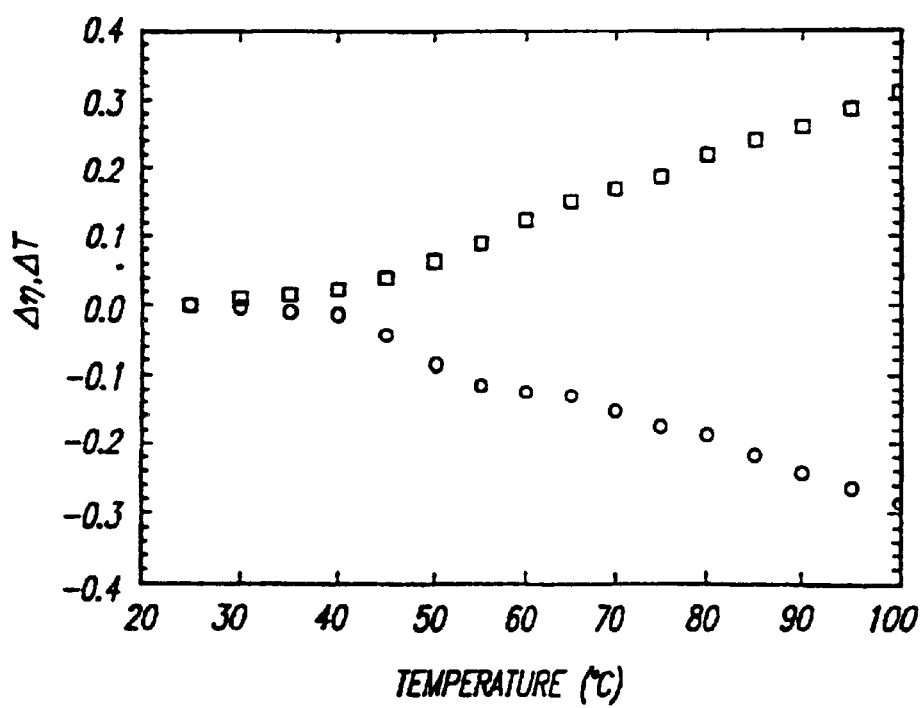
FIG. 6 is a graph of the normalized net transmittance and the normalized net diffraction efficiency of a hologram.

Smaller liquid crystal droplet sizes have the problem that it takes high switching voltages to switch their orientation. As described in the previous paragraph, using alternating current switching voltages at high frequencies helps reduce the needed switching voltage. As demonstrated in FIG. 4, it has been found that adding a surfactant (e.g., octanoic acid) the prepolymer material in amounts of about 4%–6% by weight of the total mixture results in sample holograms with switching voltages near 5 Vrms at lower frequencies of 1–2 kHz. As shown in FIG. 5, it has also been found that the use of the surfactant with the associated reduction in droplet size, reduces the switching time of the PDLC materials. Thus, samples made with surfactant can be switched on the order of 25–44 microseconds. Without wishing to be bound by any theory, the surfactant is believed to reduce switching voltages by reducing the anchoring of the liquid crystals at the interface between liquid crystal and cured polymer.

Thermal control of diffraction efficiency is illustrated in FIG. 5. FIG. 5 is a graph of the normalized net transmittance and normalized net diffraction efficiency of a hologram made according to the teachings of this disclosure versus temperature.

The polymer dispersed liquid crystal materials described herein successfully demonstrate the utility for recording volume holograms of a particular composition for such polymer dispersed liquid crystal systems.

Figure 7:
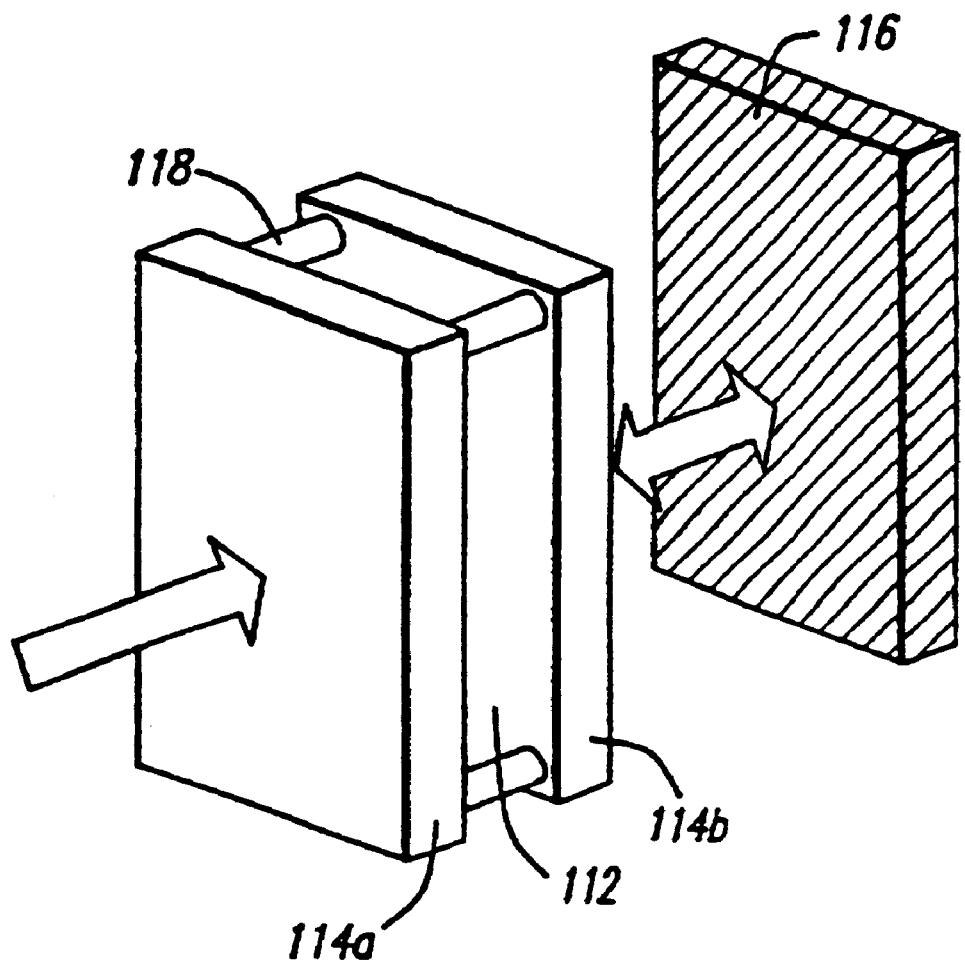
FIG. 7 is an elevational view of typical experimental arrangement for recording reflection gratings.

As shown in FIG. 7, a PDLC reflection grating is prepared by placing several drops of the mixture of prepolymer material 112 on an indium-tin oxide coated glass slide 114a. A second indium-tin oxide coated slide 114b is then pressed against the first, thereby causing the prepolymer material 112 to fill the region between the slides 114a and 114b. Preferably, the separation of the slides is maintained at approximately 20 μm by utilizing uniform spacers 118. Preparation, mixing and transfer of the prepolymer material is preferably done in the dark. Once assembled, a mirror 116 may be placed directly behind the glass plate 114b. The distance of the mirror from the sample is preferably substantially shorter than the coherence length of the laser. The PDLC material is preferably exposed to the 488 nm line of an argon-ion laser, expanded to fill the entire plane of the glass plate, with an intensity of approximately 0.1–100 mWatts/cm$^2$ with typical exposure times of 30–120 seconds. Constructive and destructive interference within the expanded beam establishes a periodic intensity profile through the thickness of the film.

In one embodiment, the prepolymer material utilized to make a reflection grating comprises a monomer, a liquid crystal, a cross-linking monomer, a coinitiator, and a photoinitiator dye. The reflection grating may be formed from prepolymer material comprising by total weight of the monomer dipentaerythritol hydroxypentacrylate (DPHA), 35% by total weight of a liquid crystal comprising a mixture of cyano biphenyls (known commercially as "E7"), 10% by total weight of a cross-linking monomer comprising N-vinylpyrrolidinone ("NVP"), 2.5% by weight of the coinitiator N-phenylglycine ("NPG"),and $10^{-5}$ to $10^{-6}$ gram moles of a photoinitiator dye comprising rose bengal ester. Further, as with transmission gratings, the addition of surfactants is expected to facilitate the same advantageous properties discussed above in connection with transmission gratings. It is also expected that similar ranges and variation of prepolymer starting material will find ready application in the formation of suitable reflection gratings.

It has been determined by low voltage, high resolution scanning electron microscopy ("LVHRSEM") that the resulting material comprises a fine grating with a periodicity of 165 nm with the grating vector perpendicular to the plane of the surface. Thus, as shown schematically in FIG. 8a, grating 130 includes periodic planes of polymer channels 130a and PDLC channels 130b which run parallel to the front surface 134. The grating spacing associated with these periodic planes remains relatively constant throughout the full thickness of the sample from the air/film to the film/substrate interface.

Although interference is used to prepare both transmission and reflection gratings, the morphology of the reflection grating differs significantly. In particular, it has been determined that, unlike transmission gratings with similar liquid crystal concentrations, very little coalescence of individual droplets was evident. Further more, the droplets that were present in the material were significantly smaller having diameters between 50 and 100 nm. Furthermore, unlike transmission gratings where the liquid crystal-rich regions typically comprise less than 40% of the grating, the liquid crystal-rich component of a reflection grating is significantly larger. Due to the much smaller periodicity associated with reflection gratings, i.e., a narrower grating spacing (~0.2 microns), it is believed that the time difference between completion of curing in high intensity versus low intensity regions is much smaller. It is also believed that the fast polymerization, as evidenced by small droplet diameters, traps a significant percentage of the liquid crystal in the matrix during gelation and precludes any substantial growth of large droplets or diffusion of small droplets into larger domains.

Analysis of the reflection notch in the absorbance spectrum supports the conclusion that a periodic refractive index modulation is disposed through the thickness of the film. In PDLC materials that are formed with the 488 nm line of an argon ion laser, the reflection notch typically has a reflection wavelength at approximately 472 nm for normal incidence and a relatively narrow bandwidth. The small difference between the writing wavelength and the reflection wavelength (approximately 5%) indicates that shrinkage of the film is not a significant problem. Moreover, it has been found that the performance of such gratings is stable over periods of many months.

In addition to the materials utilized in the one embodiment described above, it is believed that suitable PDLC materials could be prepared utilizing monomers such as triethyleneglycol diacrylate, trimethylolpropanetriacrylate, pentaerytritol triacrylate, pentaerythritol tetracrylate, pentaerythritol pentacrylate, and the like. Similarly, other coinitiators such as triethylamine, triethanolamine, N,N-dimethyl-2,6-diisopropylaniline, and the like could be used instead of N-phenylglycine. Where it is desirable to use the 458 nm, 476 nm, 488 nm or 514 nm lines of an Argon ion laser, that the photoinitiator dyes rose bengal sodium salt, eosin, eosin sodium salt, fluorescein sodium salt and the like will give favorable results. Where the 633 nm line is utilized, methylene blue will find ready application. Finally, it is believed that other liquid crystals such as 4'-pentyl-4-cyanobiphenyl or 4'-heptyl-4-cyanobiphenyl, can be utilized.

Figure 8B:
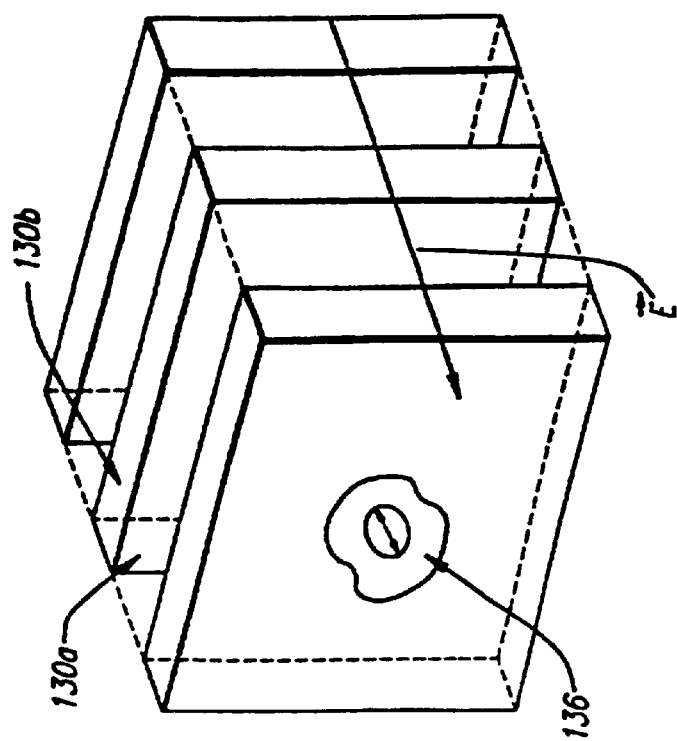
FIGS. 8a and 8b are elevational views of a reflection grating, made in accordance with the teachings of the description herein, having periodic planes of polymer channels and PDLC channels disposed parallel to the front surface in the absence of a field (FIG. 8a) and with an electric field applied (FIG. 8b) wherein the liquid-crystal utilized in the formation of the grating has a positive dielectric anisotropy.
Figure 8A:
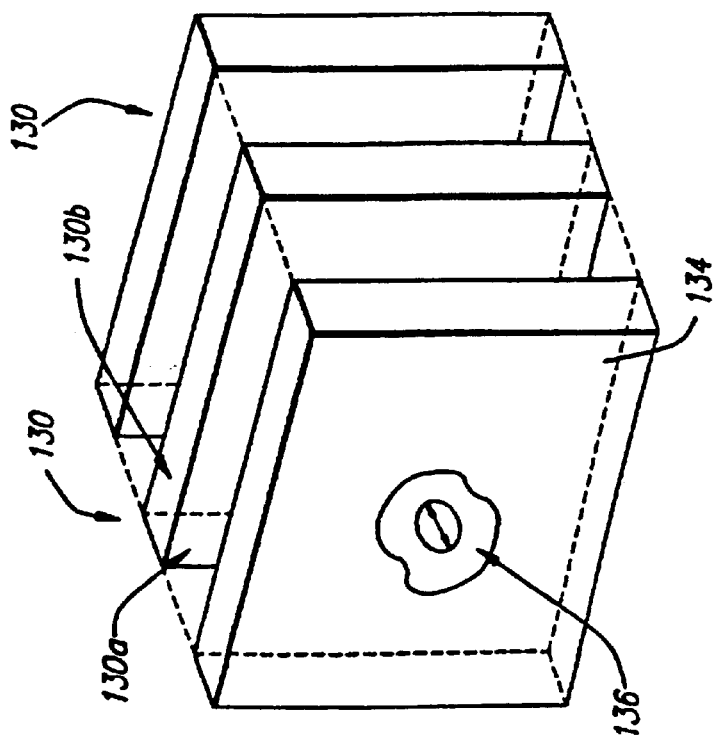

Referring again to FIG. 8a, there is shown an elevational view of a reflection grating 130 made in accordance with this disclosure having periodic planes of polymer channels 130a and PDLC channels 130b disposed parallel to the front surface 134 of the grating 130. The symmetry axis 136 of the liquid crystal domains is formed in a direction perpendicular to the periodic channels 130a and 130b of the grating 130 and perpendicular to the front surface 134 of the grating 130. Thus, when an electric field E is applied, as shown in FIG. 8b, the symmetry axis 136 is already in a low energy state in alignment with the field E and will reorient. Thus, reflection gratings formed in accordance with the procedure described above will not normally be switchable.

In general, a reflection grating tends to reflect a narrow wavelength band, such that the grating can be used as a reflection filter. In one embodiment, however, the reflection grating is formed so that it will be switchable. More particularly, switchable reflection gratings can be made utilizing negative dielectric anisotropy LCs (or LCs with a low cross-over frequency), an applied magnetic field, an applied shear stress field, or slanted gratings.

Figure 9B:
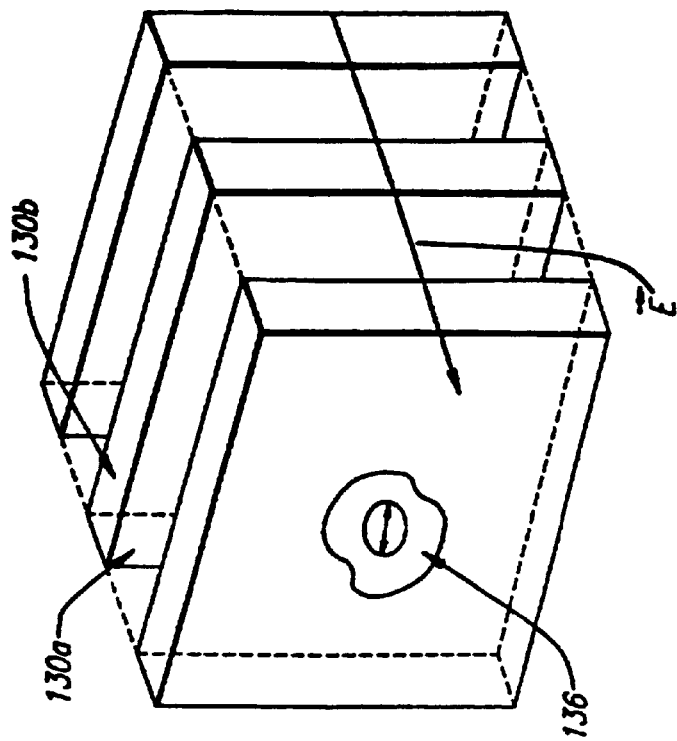
FIGS. 9a and 9b are elevational views of a reflection grating, made in accordance with the teachings of the description herein, having periodic planes of polymer channels and PDLC channels disposed parallel to the front surface of the grating in the absence of an electric field (FIG. 9a) and with an electric field applied (FIG. 9b) wherein the liquid crystal utilized in the formation of the grating has a negative dielectric anisotropy.
Figure 9A:
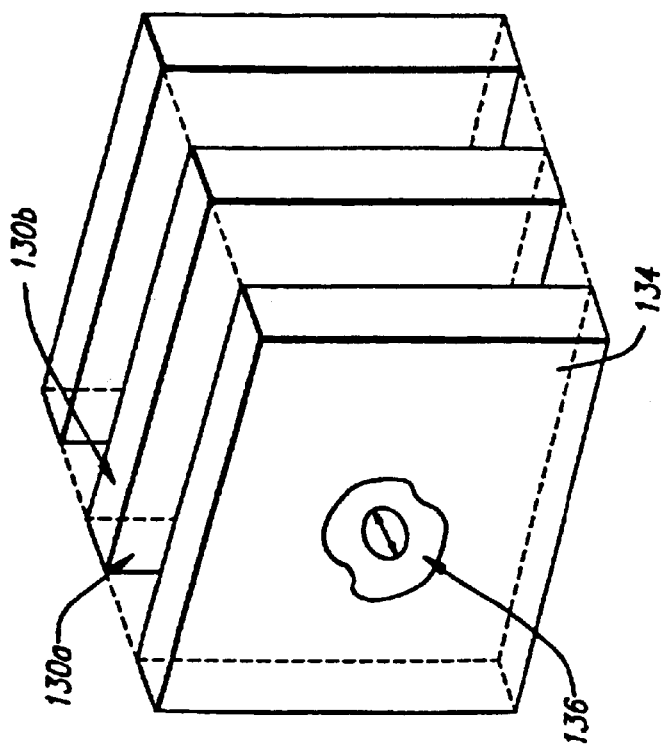

It is known that liquid crystals having a negative dielectric anisotropy ($\Delta\epsilon$) will rotate in a direction perpendicular to an applied field. As shown in FIG. 9a, the symmetry axis 136 of the liquid crystal domains formed with a liquid crystal having a negative $\Delta\epsilon$ will also be disposed in a direction perpendicular to the periodic channels 130a and 130b of the grating 130 and to the front surface 135 of the grating. However, when an electric field E is applied across such gratings, as shown in FIG. 9b, the symmetry axis of the negative $\Delta\epsilon$ liquid crystal will distort and reorient in a direction perpendicular to the field E, which is perpendicular to the film and the periodic planes of the grating. As a result, the reflection grating can be switched between a state where it is reflective and a state where it is transmissive. The following negative $\Delta\epsilon$ liquid crystals and others are expected to find ready applications in the methods and devises of the present invention:

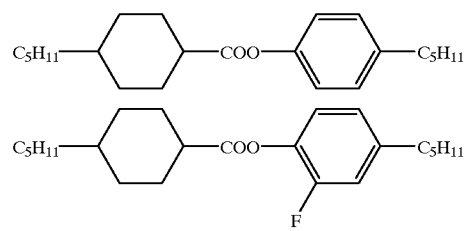

-continued

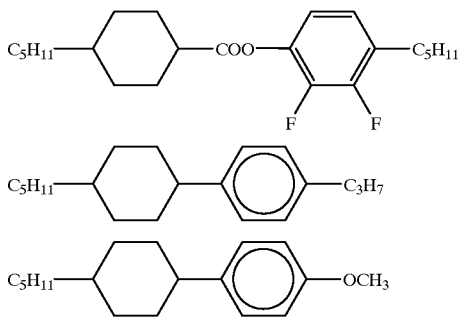

Liquid crystals can be found in nature (or synthesized) with either positive or negative $\Delta\epsilon$. Thus, it is possible to use a LC which has a positive $\Delta\epsilon$ at low frequencies, but becomes negative at high frequencies. The frequency (of the applied voltage) at which $\Delta\epsilon$ changes sign is called the cross-over frequency. The cross-over frequency will vary with LC composition, and typical values range from 1–10 kHz. Thus, by operating at the proper frequency, the reflection grating may be switched. It is expected that low crossover frequency materials can be prepared from a combination of positive and negative dielectric anisotropy liquid crystals. A suitable positive dielectric liquid crystal for use in such a combination contains four ring esters as shown below:

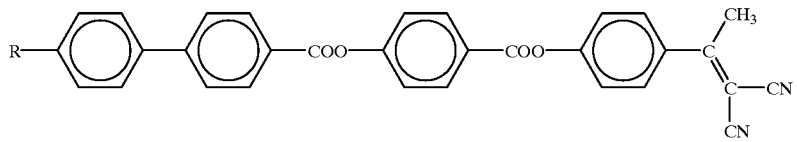

A strongly negative dielectric liquid crystal suitable for use in such a combination is made up of pyridazines as shown below:

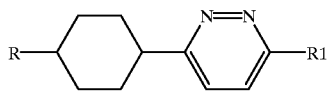

Both liquid crystal materials are available from LaRoche & Co., Switzerland. By varying the proportion of the positive and negative liquid crystals in the combination, crossover frequencies form 1.4–2.3 kHz are obtained at room temperature. Another combination suitable for use in the present embodiment is a combination of the following: p-pentylphenyl-2-chloro-4-(p-pentylbenzoyloxy) benzoate and benzoate. These materials are available from Kodak Company.

In still more detailed aspects, switchable reflection gratings can be formed using positive $\Delta\epsilon$ liquid crystals. As shown in FIG. 10a, such gratings are formed by exposing the PDLC starting material to a magnetic field during the curing process. The magnetic field can be generated by the use of Helmholtz coils (as shown in FIG. 10a), the use of a permanent magnet, or other suitable means. Preferably, the magnetic field M is oriented parallel to the front surface of the glass plates (not shown) that are used to form the grating 140. As a result, the symmetry axis 146 of the liquid crystals will orient along the field while the mixture is fluid. When polymerization is complete, the field may be removed and the alignment of the symmetry axis of the liquid crystals will remain unchanged. (See FIG. 10b.) When an electric field is applied, as shown in FIG. 10c the positive $\Delta\epsilon$ liquid crystal will reorient in the direction of the field, which is perpendicular to the front surface of grating and to the periodic channels of the grating.

Figure 11A:
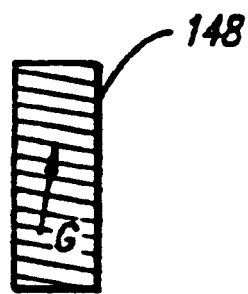
FIGS. 11a and 11b are representative side views of a slanted transmission grating (FIG. 11a) and a slanted reflection grating (FIG. 11b) showing the orientation of the grating vector G of the periodic planes of polymer channels and PDLC channels.
Figure 11B:
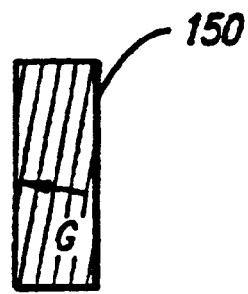

FIG. 11a depicts a slanted transmission grating 148 and FIG. 11b depicts a slanted reflection grating 150. A holographic transmission grating is considered slanted if the direction of the grating vector G is not parallel to the grating surface. In a holographic reflection grating, the grating is said to be slanted if the grating vector G is not perpendicular to the grating surface. Slanted gratings have many of the same uses as nonslanted grating such as visual displays, mirrors, line filters, optical switches, and the like.

Primarily, slanted holographic gratings are used to control the direction of a diffracted beam. For example, in reflection holograms a slanted grating is used to separate the specular reflection of the film from the diffracted beam. In a PDLC holographic grating, a slanted grating has an even more useful advantage. The slant allows the modulation depth of the grating to be controlled by an electric field when using either tangential or homeotropic aligned liquid crystals. This is because the slant provides components of the electric field in the directions both tangent and perpendicular to the grating vector. In particular, for the reflection grating, the LC domain symmetry axis will be oriented along the grating vector G and can be switched to a direction perpendicular to the film plane by a longitudinally applied field E. This is the typical geometry for switching of the diffraction efficiency of the slanted reflection grating.

When recording slanted reflection gratings, it is desirable to place the sample between the hypotenuses of two right-angle glass prisms. Neutral density filters can then be placed in optical contact with the back faces of the prisms using index matching fluids so as to frustrate back reflections which would cause spurious gratings to also be recorded. The incident laser beam is split by a conventional beam splitter into two beams which are then directed to the front faces of the prisms, and then overlapped in the sample at the desired angle. The beams thus enter the sample from opposite sides. This prism coupling technique permits the light to enter the sample at greater angles. The slant of the resulting grating is determined by the angle which the prism assembly is rotated (i.e., the angle between the direction of one incident beam an the normal to the prism front face at which that beam enters the prism).

Figure 12:
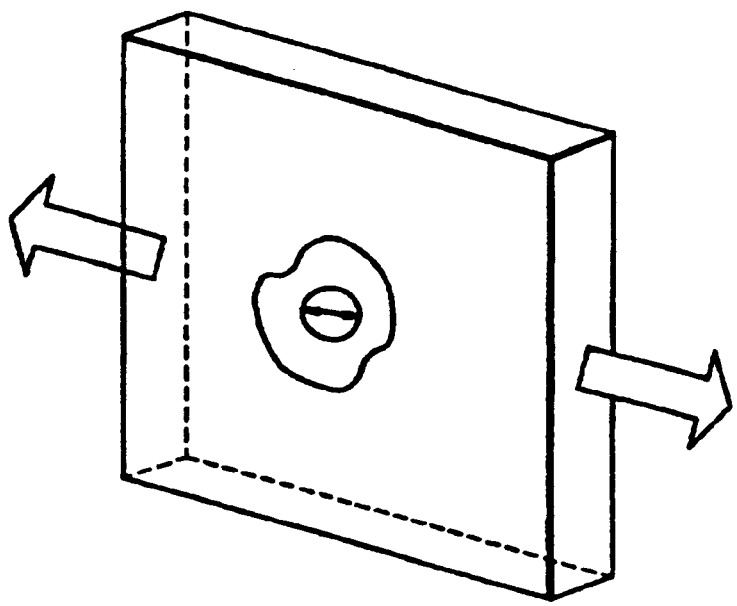
FIG. 12 is an elevational view of a reflection grating, made in accordance with the teachings of the description herein, when a shear stress field is applied thereto.

As shown in FIG. 12, switchable reflection gratings may be formed in the presence of an applied shear stress field. In this method, a shear stress would be applied along the direction of a magnetic field M. This could be accomplished, for example, by applying equal and opposite tensions to the two ITO coated glass plates which sandwich the prepolymer mixture while the polymer is still soft. This shear stress would distort the LC domains in the direction of the stress, and the resultant LC domain symmetry axis will be preferentially along the direction of the stress, parallel to the PDLC planes and perpendicular to the direction of the applied electric field for switching.

Reflection grating prepared in accordance with this description may find application in color reflective displays, switchable wavelength filters for laser protection, reflective optical elements and the like.

Figure 13:
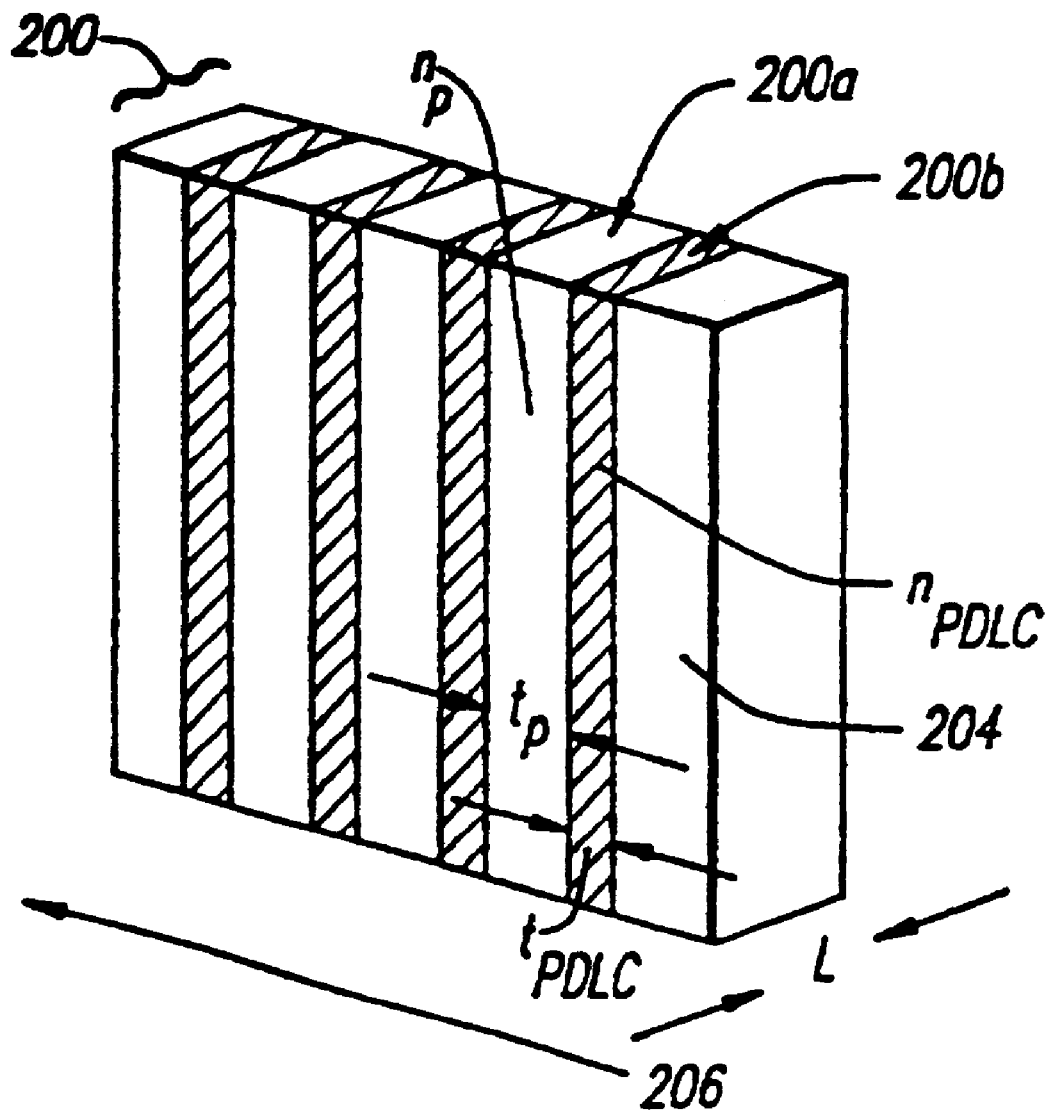
FIG. 13 is an elevational view of a subwavelength grating, made in accordance with the teachings of the description herein, having periodic planes of polymer channels and PDLC channels disposed perpendicular to the front surface of the grating.

In one embodiment, PDLC materials can be made that exhibit a property known as form birefringence whereby polarized light that is transmitted through the grating will have its polarization modified. Such gratings are known as subwavelength gratings, and they behave like a negative uniaxial crystal, such as calcite, potassium dihydrogen phosphate, or lithium niobate, with an optic axis perpendicular to the PDLC planes. Referring now to FIG. 13, there is shown an elevational view of a transmission grating 200 made in accordance with this description having periodic planes of polymer planes 200a and PDLC planes 200b disposed perpendicular to the front surface 204 of the grating 200. The optic axis 206 is disposed perpendicular to polymer planes 200a and the PDLC planes 200b. Each polymer plane 200a has a thickness $t_p$ and refractive index $n_p$, and each PDLC plane 200b has a thickness $t_{PDLC}$ and refractive index $n_{PDLC}$.

Where the combined thickness of the PDLC plane and the polymer plane is substantially less than an optical wavelength (i.e. $(t_{PDLC}+t_p) \ll \lambda$), the grating will exhibit form birefringence. As discussed below, the magnitude of the shift in polarization is proportional to the length of the grating. Thus, by carefully selecting the length, L, of the subwavelength grating for a given wavelength of light, one can rotate the plane of polarization or create circularly polarized light. Consequently, such subwavelength gratings can be designed to act as a half-wave or quarter-wave plate, respectively. Thus, an advantage of this process is that the birefringence of the material may be controlled by simple design parameters and optimized to a particular wavelength, rather than relying on the given birefringence of any material at that wavelength.

To form a half-wave plate, the retardance of the subwavelength grating must be equal to one-half of a wavelength, i.e. retardance=$\lambda/2$, and to form a quarter-wave plate, the retardance must be equal to one-quarter of a wavelength, i.e. retardance=$\lambda/4$. It is known that the retardance is related to the net birefringence, $|\Delta n|$, which is the difference between the ordinary index of refraction, $n_o$, and the extraordinary index of refraction $n_e$, of the sub-wavelength grating by the following relation:

$$Retardance=|\Delta n|L=|n_e-n_o|L$$

Thus, for a half-wave plate, i.e. a retardation equal to one-half of a wavelength, the length of the subwavelength grating should be selected go that:

$$L=\lambda/(2|\Delta n|)$$

Similarly, for a quarter-wave plate, i.e. a retardance equal to one-quarter of a wavelength, the length of the subwavelength grating should be selected so that:

$$L=\lambda/(4|\Delta n|)$$

Figure 14A:
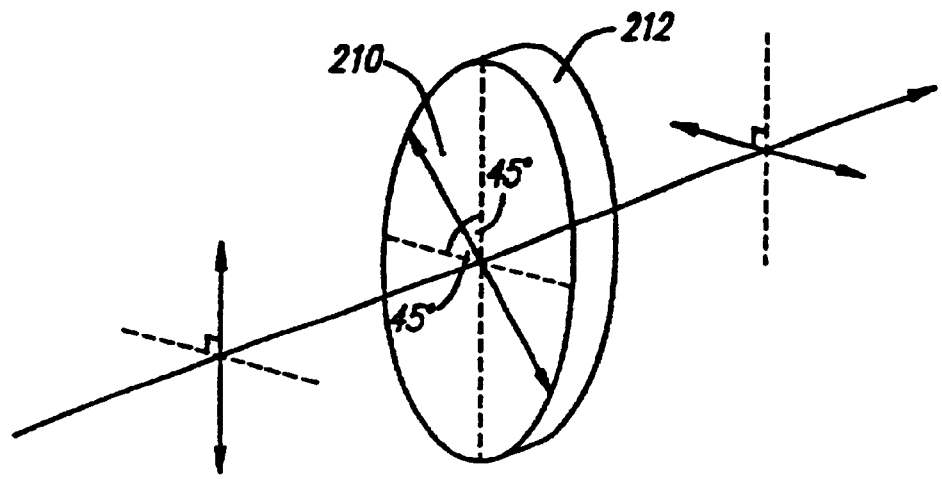
FIG. 14a is an elevational view of a switchable subwavelength, made in accordance with the teachings of the description herein, wherein the subwavelength grating functions as a half wave plate whereby the polarization of the incident radiation is rotated by 90°.
Figure 14B:
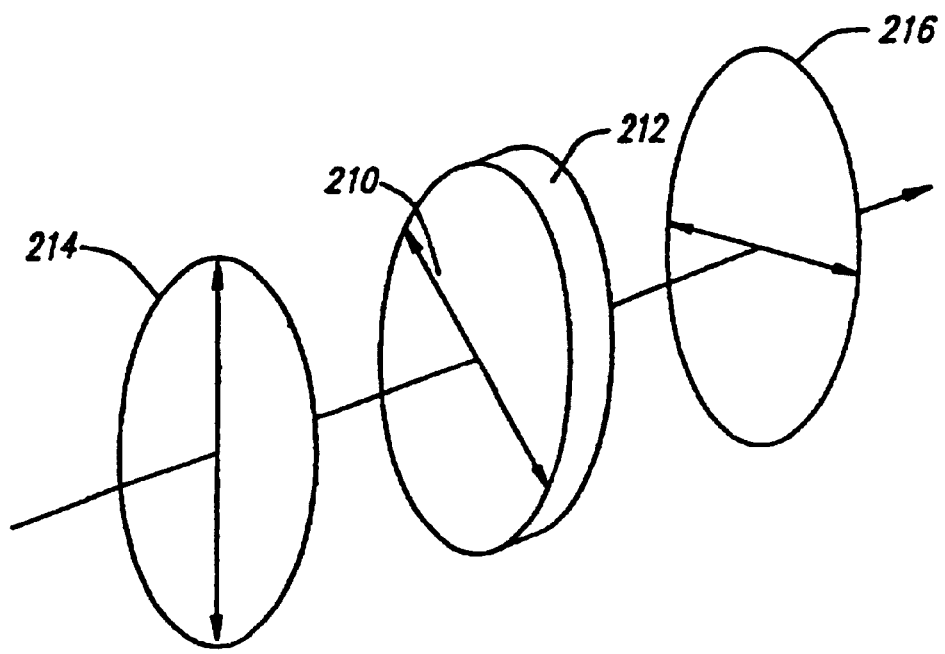
FIG. 14b is an elevational view of the switchable half wave plate shown in FIG. 14a disposed between crossed polarizers whereby the incident light is transmitted.
Figure 14C:
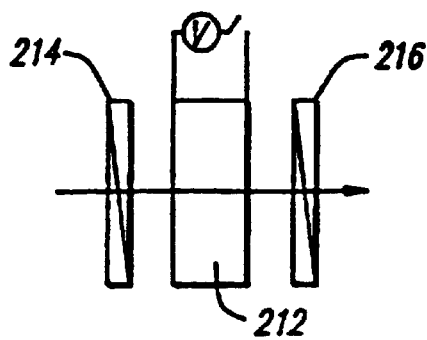
FIGS. 14c and 14d are side views of the switchable half wave plate and crossed polarizes shown FIG. 14b and showing the effect of the application of a voltage to the plate whereby the polarization of the light is no longer rotated and thus blocked by the second polarizer.
Figure 14D:
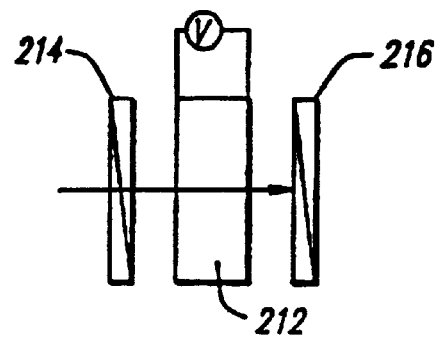

If, for example, the polarization of the incident light is at an angle of 45° with respect to the optic axis 210 of a half-wave plate 212, as shown in FIG. 14a, the plane polarization will be preserved, but the polarization of the wave exiting the plate will be shifted by 90°. Thus, referring now to FIG. 14b and 14c, where the half-wave plate 212 is placed between cross polarizers 214 and 216, the incident light will be transmitted. If an appropriate switching voltage is applied, as shown in FIG. 14d, the polarization of the light is not rotated and the light will be blocked by the second polarizer.

Figure 15A:
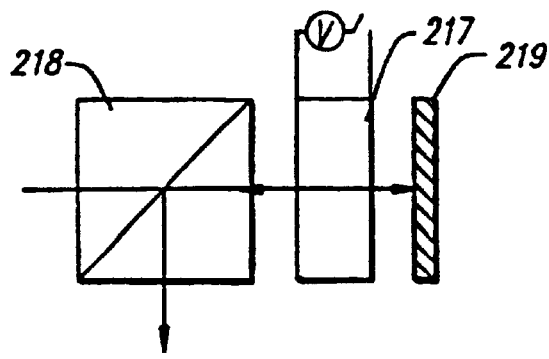
FIG. 15a is a side view of a switchable subwavelength grating, made in accordance with the teachings of the description herein, wherein the subwavelength grating functions as a quarter wave plate whereby plane polarized light is transmitted through the subwavelength grating, retroreflected by a mirror and reflected by the beam splitter.
Figure 15B:
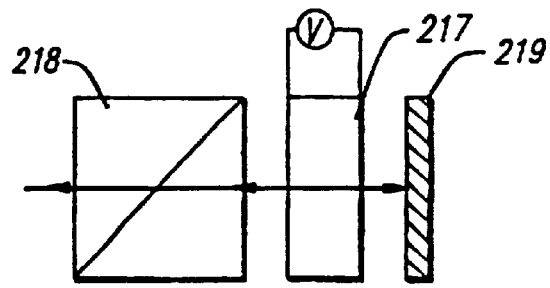
FIG. 15b is a side view of the switchable subwavelength grating of FIG. 15a and showing the effect of the application of a voltage to the plate whereby the polarization of the light is no longer modified, thereby permitting the reflected light to pass through the beam splitter.

For a quarter wave plate plane polarized light is converted to circularly polarized light. Thus, referring now to FIG. 15a, where quarter wave plate 217 is placed between a polarizing beam splitter 218 and a mirror 219, the reflected light will be reflected by the beam splitter 218. If an appropriate switching voltage is applied, as shown in FIG. 15b, the reflected light will pass through the beam splitter and be retroreflected on the incident beam.

Figure 16A:
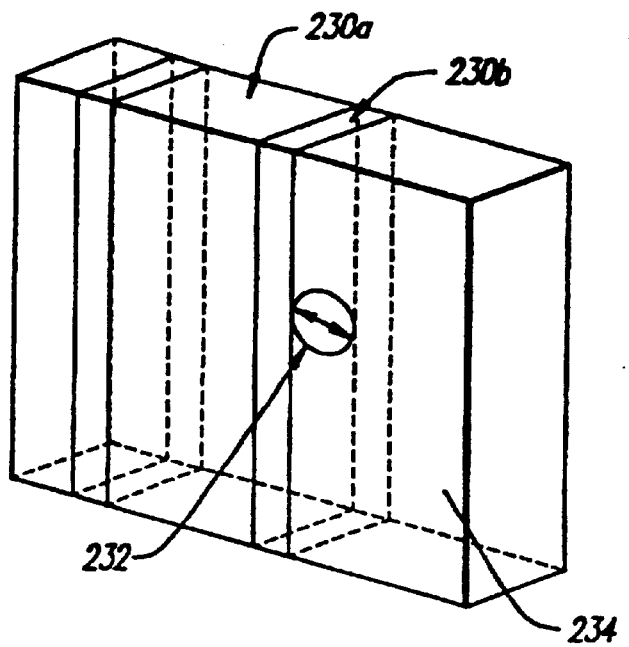
FIGS. 16a and 16b are elevational views of a transmission grating, made in accordance with the teachings of the description herein, having periodic planes of polymer channels and PDLC channels disposed perpendicular to the front face of the grating in the absence of an electric field (FIG. 16a) and with an electric field applied (FIG. 16b) wherein the liquid crystal utilized in formation of the grating has a positive dielectric anisotropy.

Referring now to FIG. 16a, there is shown an elevational view of a subwavelength grating 230 recorded in accordance with the above-described methods and having periodic planes of polymer channels 230a and PDLC channels 230b disposed perpendicular to tile front surface 234 of grating 230. As shown in FIG. 16a, the symmetry axis 232 of the liquid crystal domains is disposed in a direction parallel to the front surface 234 of the grating and perpendicular to the periodic channels 230a and 230b of the grating 230. Thus, when an electric field E is applied across the grating, as shown in FIG. 15b, the symmetry axis 232 distorts and reorients in a direction along the field E, which is perpendicular to the front surface 234 of the grating and parallel to the periodic channels 230a and 230b of the grating 230. As a result, subwavelength grating 230 can be switched between a state where it changes the polarization of the incident radiation and a state in which it does not. Without wishing to be bound by any theory, it is currently believed that the direction of the liquid crystal domain symmetry 232 is due to a surface tension gradient which occurs as a result of the anisotropic diffusion of monomer and liquid crystal during recording of the grating and that this gradient causes the liquid crystal domain symmetry to orient in a direction perpendicular to the periodic planes.

As discussed in Born and Wolf, Principles of Optics, 5$^{th}$ Ed., New York (1975) and incorporated herein by reference, the birefringence of a subwavelength grating is given by the following relation:

$$n_e^2-n_o^2=-[(f_{PDLC})(f_p)(n_{PDLC}^2-n_p^2)]/[f_{PDLC}n_{PDLC}^2+f_p n_p^2]$$

Where $n_o$=the ordinary index of refraction of the subwavelength grating;

$n_e$=the extraordinary index of refraction;

$n_{PDLC}$=the refractive index of the PDLC plane;

$n_p$=the refractive index of the polymer plane $n_{LC}$=the effective refractive index of the liquid crystal seen by an incident optical wave;

$f_{PDLC}=t_{PDLC}/(t_{PDLC}+t_p)$ $f_P=t_P/(t_{PDLC}+t_P)$

Thus, the net birefringence of the subwavelength grating will be zero if $n_{PDLC}=n_P$.

It is known that the effective refractive index of the liquid crystal, $n_{LC}$, is a function of the applied electric field, having a maximum when the field is zero and value equal to that of the polymer, $n_P$, at some value of the electric field, $E_{MAX}$. Thus, by application of an electric field, the refractive index of the liquid crystal, $n_{LC}$, and, hence, the refractive index of the PDLC plane can be altered. Using the relationship set forth above, the net birefringence of a subwavelength grating will be a minimum when $n_{PDLC}$ is equal to $n_P$, i.e. when $n_{LC}=n_P$. Therefore, if the refractive index of the PDLC plane can be matched to the refractive index of the polymer plane, i.e. $n_{PDLC}=n_P$, by the application of an electric field, the birefringence of the subwavelength grating can be switched off.

The following equation for net birefringence, i.e. $|\Delta n|=|n_e-n_o|$, follows from the equation given in Born and Wolf (reproduced above):

$$\Delta n=-[(f_{PDLC})(f_p)(n_{PDLC}^2-n_P^2)]/[2n_{AVG}(f_{PDLC}n_{PDLC}^2+f_p n_p^2)]$$

where $n_{AVG}=(n_e+n_o)/2$

Furthermore, it is known that the refractive index of the PDLC plane $n_{PDLC}$ is related to the effective refractive index of the liquid crystal seen by an incident optical wave, $n_{LC}$, and the refractive index of the surrounding polymer plane, $n_P$, by the following relation:

$$N_{PDLC}=n_P+f_{LC}[n_{LC}-n_P]$$

Where $f_{LC}$ is the volume fraction of liquid crystal dispersed in the polymer within the PDLC plane, $f_{LC}=[V_{LC}/(V_{LC}+V_P)]$.

By way of example, a typical value for the effective refractive index for the liquid crystal in the absence of an electric field Is $n_{LC}=1.7$, and for the polymer layer $n_P, =1.5$. For the grating where the thickness of the PDLC planes and the polymer planes are equal (i.e. $t_{PDLC}=t_P$, $f_{PDLC}=0.5=f_P$) and $f_{LC}=0.35$, the net birefringence, $\Delta n$, of the subwavelength grating is approximately 0.008. Thus, where the incident light has a wavelength of 0.8 µm, the length of the subwavelength grating should be 50 µm for a half-wave plate and a 25 µm for a quarter-wave plate. Furthermore, by application of an electric field of approximately 5 V/µm, the refractive index of the liquid crystal can be matched to the refractive index of the polymer and the birefringence of the subwavelength grating turned off. Thus, the switching voltage, $V_n$, for a half-wave plate is on the order of 250 volts, and for a quarter-wave plate approximately 125 volts.

By applying such voltages, the plates can be switched between the on and off (zero retardance) states on the order of microseconds. As a means of comparison, current Pockels cell technology can be switched in nanoseconds with voltages of approximately 1000–2000 volts, and bulk nematic liquid crystals can be switched on the order of milliseconds with voltages of approximately 5 volts.

Figure 17:
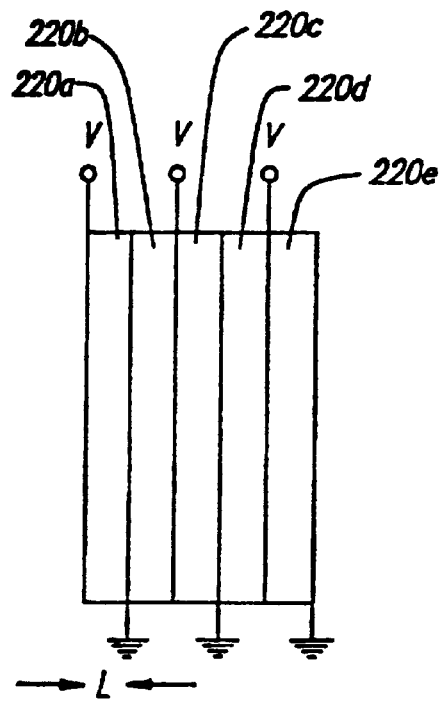
FIG. 17 is a side view of five subwavelength gratings wherein the gratings are stacked and connected electrically in parallel thereby reducing the switching voltage of the subwavelength grating.
Figure 16B:
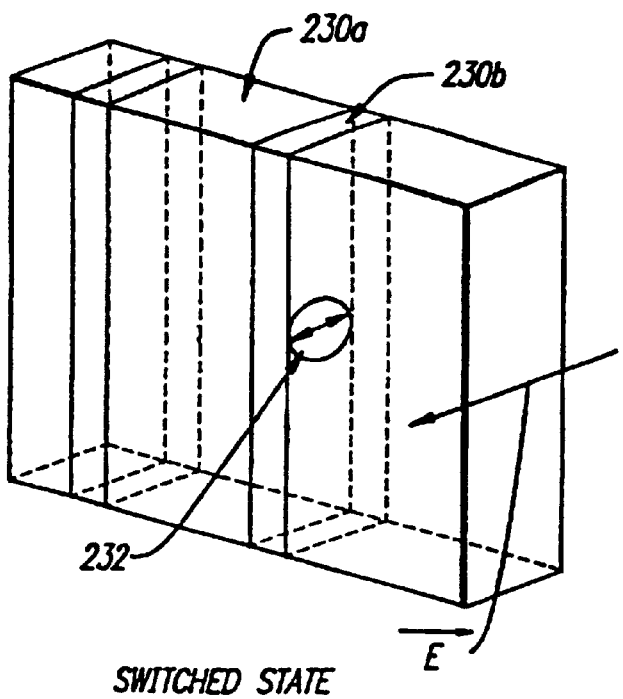

In an alternative embodiment, as shown in FIG. 17, the switching voltage of the subwavelength grating can be reduced by stacking several subwavelength gratings 220a–220e together, and connecting them electrically in parallel. By way of example, it has been found that a stack of five gratings each with a length of 10 µm yields the thickness required for a half-wave plate. It should be noted that the length of the sample is somewhat greater than 50 µm, because each grating includes an indium-tin-oxide coating which acts as a transparent electrode. The switching voltage for such a stack of plates, however, is only 50 volts.

Subwavelength gratings in accordance with the this description are expected to find suitable application in the areas of polarization optics and optical switches for displays and laser optics, as well as tunable filters for telecommunications, colorimetry, spectroscopy, laser protection, and the like. Similarly, electrically switchable transmission gratings have many applications for which beams of light must be deflected or holographic images switched. Among these applications are: Fiber optic switches, reprogrammable N×N optical interconnects for optical computing, beam steering for laser surgery, beam steering for laser radar, holographic image storage and retrieval, digital zoom optics (switchable holographic lenses), graphic arts and entertainment, and the like.

A switchable hologram is one for which the diffraction efficiency of the hologram may be modulated by the application of an electric field, and can be switched from a fully on state (high diffraction efficiency) to a fully off state (low or zero diffraction efficiency). A static hologram is one whose properties remain fixed independent of an applied field. In accordance with this description, a high contrast status hologram can also be created. In this variation of this description, the holograms are recorded as described previously. The cured polymer film is then soaked in a suitable solvent at room temperature for a short duration and finally dried. For the liquid crystal E7, methanol has shown satisfactory application. Other potential solvents include alcohols such as ethanol, hydrocarbons such as hexane and heptane, and the like. When the material is dried, a high contrast status hologram with high diffraction efficiency results. The high diffraction efficiency is a consequence of the large index modulation in the film ($\Delta n\sim 0.5$) because the second phase domains are replaced with empty (air) voids ($n\sim 1$).

Similarly, in accordance with this description a high birefringence static subwavelength wave-plate can also be formed. Due to the fact that the refractive index for air is significantly lower than for most liquid crystals, the corresponding thickness of the half-wave plate would be reduced accordingly. Synthesized wave-plates in accordance with this description can be used in many applications employing polarization optics, particularly where a material of the appropriate birefringence that the appropriate wavelength is unavailable, too costly, or too bulky.

The term polymer dispersed liquid crystals and polymer dispersed liquid crystal material includes, as may be appropriate, solutions in which none of the monomers have yet polymerized or cured, solutions in which some polymerization has occurred, and solutions which have undergone complete polymerization. Those of skill in the art will clearly understand that the use herein of the standard term used in the art, polymer dispersed liquid crystals (which grammatically refers to liquid crystals dispersed in a fully polymerized matrix) is meant to include all or part of a more grammatically correct prepolymer dispersed liquid crystal material or a more grammatically correct starting material for a polymer dispersed liquid crystal material.

2. Imaging and Display System

Figure 18:
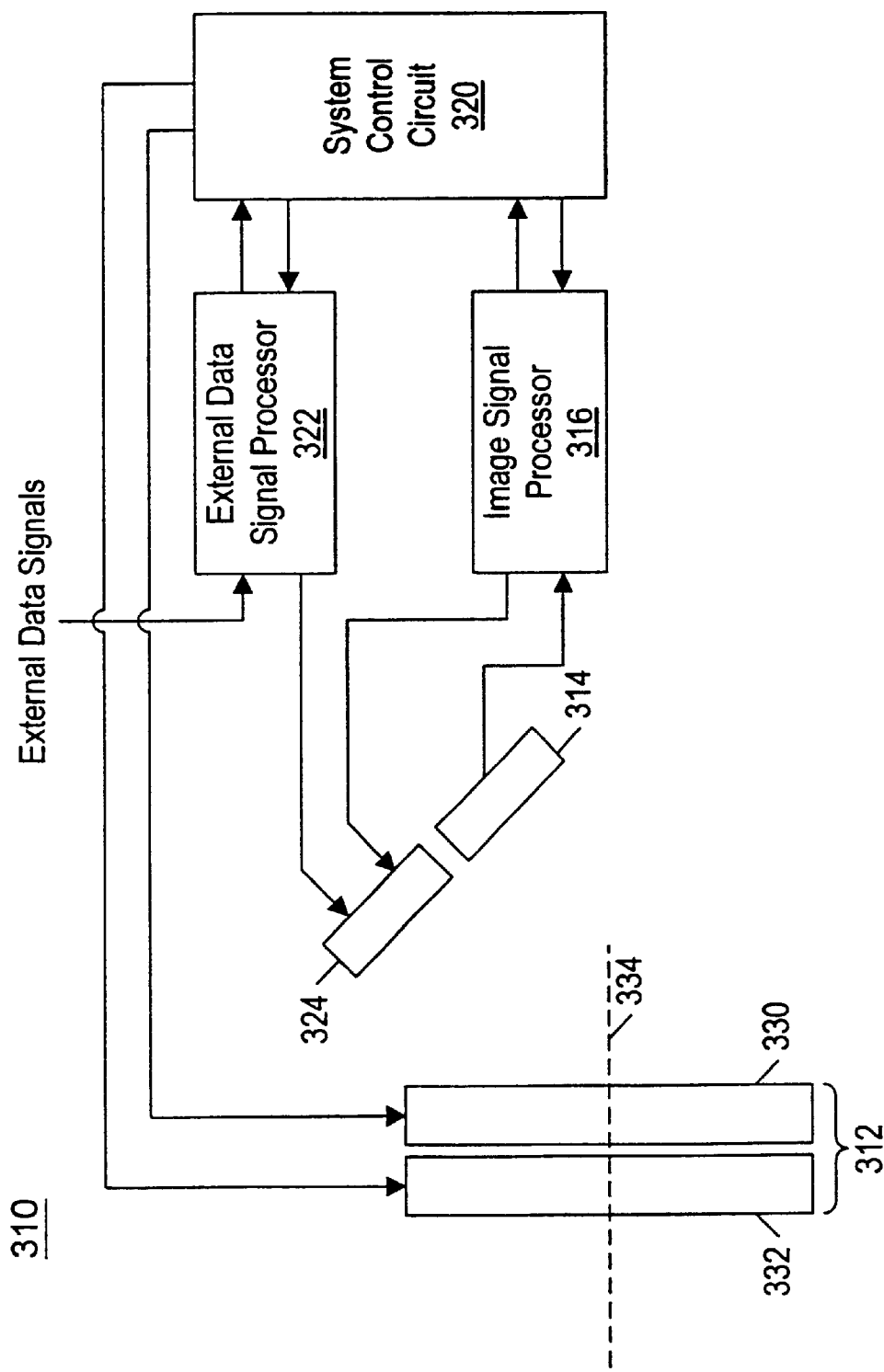
FIG. 18 is a diagram of an image and display system employing the present invention.

FIG. 18 shows one embodiment of an imaging and display system 310 employing the present invention. More particularly, FIG. 18 shows imaging and display system 310 having an optical system 312, a sensor array 314, a image signal processor 316, a system control circuit 320, an external data signal processor 322, and a light source 324. Some conventional optical elements (not shown) may be required to correct for aberrations of optical system 312. Additionally, image relay optics and display illumination optics may also be required. System control circuit 320 is shown coupled to optical system 312, image signal processor 316, and external data signal processor 122. Although not shown, system control circuit 320 may also be coupled to sensor array 314 and light source 324. System control circuit 320 provides control signals controlling various components within system 310.

Optical system 312 in one embodiment may include first and second groups 330 and 332, respectively, of one or more optical elements. In one embodiment, one or more of the optical elements may include a dynamic or switchblade hologram or holographic layer formed from a polymer dispersed liquid crystal (PDLC) described above. For example, a switchable hologram may be formed in a hologram recording process in which PDLC material undergoes phase separation, creating regions densely populated by liquid crystal micro-droplets, interspersed by regions of clear photopolymer. The resulting switchable hologram exhibits high diffraction efficiencies and fast switching times between active and inactive states as will be more filly described below.

In one embodiment, Switchable holographic layer or layers formed of materials other than PDLC are also contemplated for use within first or second groups 330 and 332, respectively. Additionally, each or either of the first and second groups 330 and 332 may consist of one or more non-switchable or static holographic optical elements.

In the embodiment shown in FIG. 18, the first and second groups of optical elements 330 and 332, respectively, are aligned on and transverse to a common axis 334. However, it is to be noted that first and second groups of optical elements 330 and 332, respectively, may be positioned remote to each other while still being employed in an imaging and display system. Moreover, it is noted that first and second group of optical elements 330 and 332 may be tilted with respect to each other while aligned on common axis 334.

Figure 21:
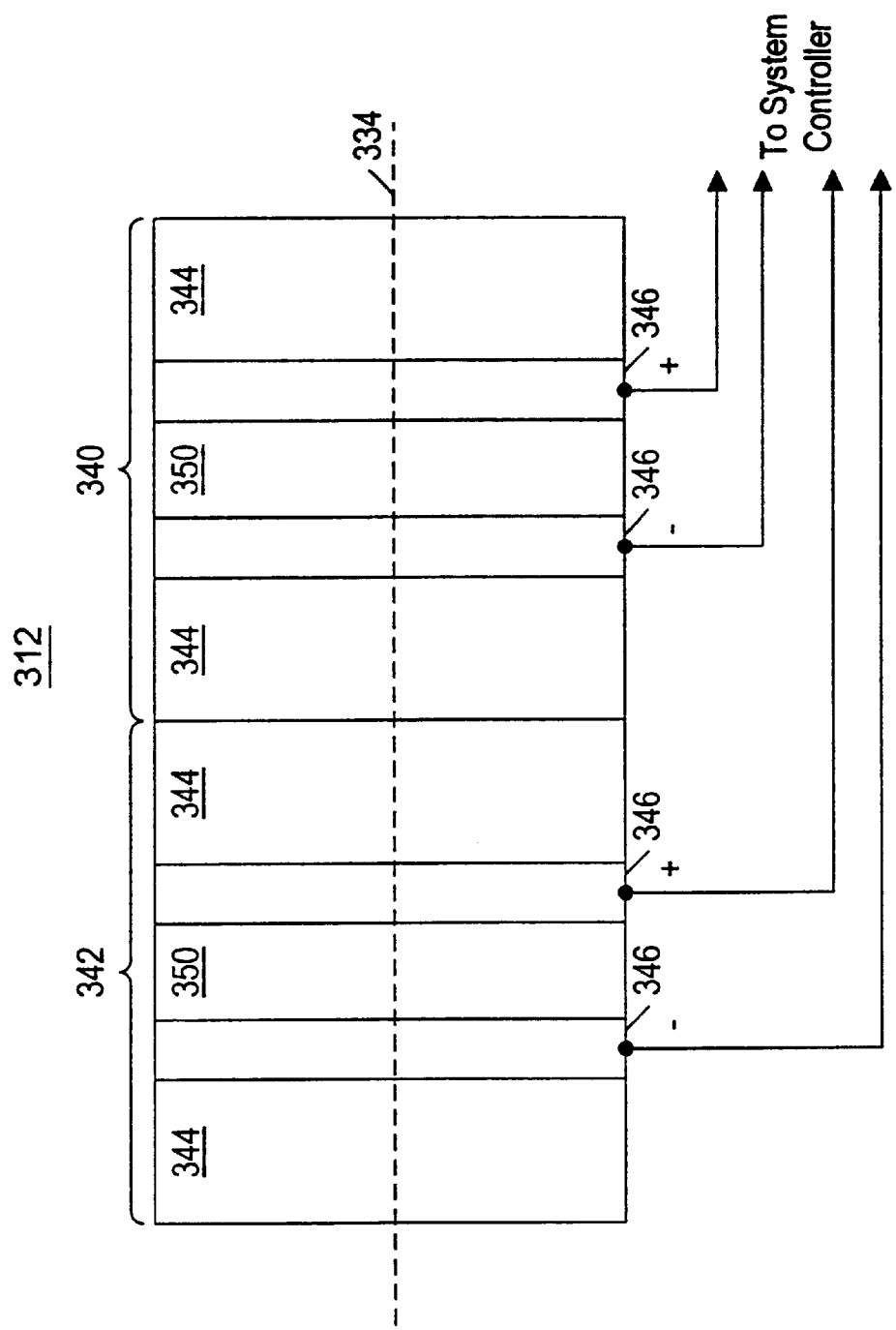
FIG. 21 is a cross sectional view of one embodiment of an optical system that can be employed in the system shown in FIG. 18.

FIG. 21 shows a cross sectional view of one embodiment of the optical system 312 shown in FIG. 18. In the embodiment shown in FIG. 21, first and second groups 330 and 332 include a single optical element 340 and 342, respectively. Again, while FIG. 21 shows first and second optical elements 340 and 342 positioned adjacent to each other and aligned along common axis 334, the present invention should not be limited thereto. Rather, first and second optical elements 340 and 342 may be positioned remote from each other on separate axes.

In the embodiment shown in FIG. 21, each optical element 340 and 342 includes a pair of substantially transparent and electrically nonconductive layers 344, a pair of substantially transparent and electrically conductive layers 346, and a switchable holographic layer 350 that includes, in one embodiment, a polymer dispersed liquid crystal (PDLC) that records a hologram. The structure of each optical element of FIG. 21 is similar to that shown in FIG. 1 In one embodiment, the substantially transparent, electrically nonconductive layers 344 comprise glass while the electrically conductive, substantially light transparent layers 46 comprise indium tin oxide (ITO). In this embodiment, all layers 344–350 are aligned like a stack of pancakes on common axis 334. Optionally, layers 344–350 of the system shown in FIG. 21 may have substantially thin cross-sectional thicknesses thereby providing a substantially thin aggregate in the cross section. More particularly, switchable layers 350 may have a cross-sectional thickness of 5–12 microns while glass layers 344 may have a cross-sectional thickness of 0.4–0.8 millimeters. Obviously, ITO layers 346 must be substantially thin to be substantially transparent. The optical properties of any coating depends on thickness and refractive index. As such ITO layers should have an appropriate reflective index.

In one embodiment, ITO layers 346 are selectively coupled to a voltage source (not shown in FIG. 21). In FIG. 21, ITO layers 346 are configured to be selectively coupled to a voltage source via system controller 320 (see also FIG. 18). In one embodiment, ITO layers 346 of the first and second optical elements 340 and 342, respectively, are alternatively coupled to the voltage source by system controller 320. When the ITO layers of one of the optical elements 340 and 342 are coupled to the voltage source, the corresponding optical element is said to operate in the inactive state. More particularly, when the ITO layers of one of the optical elements 340 and 342 are coupled to the voltage source, an electrical field is established therebetween. The electrical field operates, in essence, to erase a hologram recorded in holographic layer 350 thereby allowing light incident thereon to pass substantially unaltered. When the ITO layers of one of the optical elements 340 and 342 are disconnected from the voltage source, the optical element is said to operate in the active state. More particularly, when the ITO layers of one of the optical elements 340 and 342 are decoupled from the voltage source, no electric field is present therebetween, and the hologram recorded in holographic layer 350 substantially alters light incident thereon.

As noted above, light incident upon an inactive optical element is substantially unaltered. In contrast, an active optical element substantially alters light incident thereon. An optical element in its active stated depending upon its configuration, can function substantially similar to any conventional optical element such as a converging lens, a diverging lens, a reflector (mirror), or a band pass filter. For example, optical element 340 may be configured to operate like a converging lens in the active state so that light incident thereon converges to a focal surface in space somewhere adjacent thereto. Optical element 342 may be configured to operate in the active state to reflect incident light by diffraction. It is noted that reflective optical elements diffract a first incident light received on a surface to produce a first diffracted light, the first diffracted light emerging from the surface that received the first incident light. The first diffracted light may emerge form the surface of the reflective optical element at an angle that is unequal to the incident angle of the first incident light.

Additionally, each or either optical element 340 and 342 may operate on a narrow wavelength band of incident light. However, it is to be remembered that in the inactive state, each of the optical elements 340 and 342 transmit incident light without substantial alteration. Accordingly, if optical elements 340 and 342 operate in the inactive state concurrently, incident light will be transmitted without substantial alteration.

The switchable layers 350 described above enable conventional optical element-like functions when active. The switchable layers 50, in one embodiment, include PDLC material that records a hologram using holographic techniques. The hologram acts as a conventional optical element when the switchable layer is in the active state. Ideally, the optical elements would be based on PDLC materials onto which holograms characterized by high diffraction efficiency and fast switching rate can be recorded. In such a system, the holograms can be switched from a diffracting or active state to a passive or inactive state. In one embodiment, the holograms would need to be of the Bragg type in order to achieve high-defraction efficiency. The holograms, in one embodiment, result in an interference pattern created by recording beams (i.e., a reference beam and an object beam) within layer 350. Interaction of the laser light with the PDLC material causes photopolymerization. Liquid crystal droplets become embedded in the region of the bright fringes which are formed by the intersection of the recording beams during the hologram recording process. When a voltage is applied to ITO layers 346 the liquid crystal droplets in layer 350 reorient and change the effective refractive index of layer 350 thereby essentially erasing the hologram recorded therein. The material used within layer 350 is configured to operate at a high switching rate (e.g., the material can be switched in tens of microseconds, which is very fast when compared with conventional liquid crystal display materials), and a high diffraction efficiency.

Figure 20A:
FIGS. 20a–20d are block diagrams of optical system examples which can be employed in the system of FIG. 18.

FIGS. 20a–20d are block diagrams of several embodiments of the optical system 312 shown in FIG. 18. In one embodiment, optical system 312 shown in FIG. 20a is substantially similar to the optical system 312 shown in FIG. 21. In the embodiment shown in FIG. 20a, first group 330 comprises a single optical element configured to converge infrared light when operating in the active state. Second group 332 comprises a single optical element configured to reflect monochrome light incident thereon when in the active state. It is noted that the optical elements within FIG. 20a transmit all light substantially unaltered when in the inactive state. The optical system 312 shown in FIG. 20a may be employed in an infrared imaging and display system.

Figure 20B:
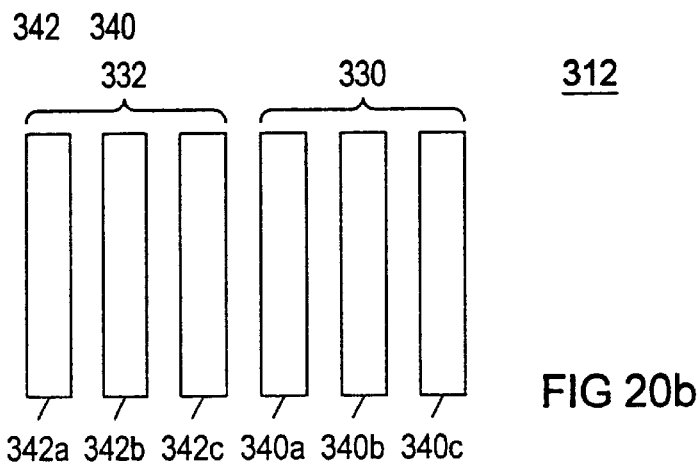

FIG. 20b shows an alternative optical system 312 with first and second groups 330 and 332, respectively, each having three distinct optical elements. More particularly, first group 330 comprises three optical elements, 340a–340c, and second group 332 comprises three optical elements 342a–342c. Each of the optical elements 340a–340c within the first group 330 is similar to the optical element 340 shown in FIG. 21. More particularly, each optical element 340a–340c when active operates to converge light incident thereon. However, each optical element 340a–340c differs from the optical element 340 shown in FIG. 21 in one important aspect. While the optical element 340 shown in FIG. 21 is optimized to transmit infrared light in the active state, each optical element 340a–340c shown in FIG. 20b is optimized pass a narrow band of visible light. For example, optical element 340a when active is optimized to pass a narrow band of red light, optical element 340b when active is optimized to pass a narrow band of blue light, and optical element 340c when active is optimized past a narrow band of green light. Each of the optical elements 342a–342c of the second group of 332 is similar to the optical element of 342 shown in FIG. 21. Namely, each of the optical elements, 342a–342c, when active, operates to reflect incident light by diffraction. However, each of the optical elements 342a–342c shown in FIG. 20b is different from the optical element 342 shown in FIG. 21 in one material aspect. While the optical element 342 shown in FIG. 21 is optimized to reflect monochrome light incident thereon, each of the optical elements 342a–342c shown in FIG. 20b is itemized to reflect a narrow band of visible light. For example, optical element 342a is optimized to reflect red light incident thereon when active, optical element 342b is optimized to reflect blue light when active, and optical element 342c is optimized to reflect green light when active.

Each optical element, 340a–340c and 342a–342c shown in FIG. 20b is coupled to the system controller 320 (not shown in FIG. 20b). Like the system shown in FIG. 21, only one of the optical elements 340a–340c and 342a–342c shown in PIG. 20b is activated while the remaining optical elements are inactive. For example, system controller 320 may activate optical element 340a so that system 312 operates to converge and pass narrow band red light incident thereon. Alternatively, system controller 320 may activate optical element 342c while deactivating the remaining optical elements shown in FIG. 20b. In this configuration, optical system 312 would operate to reflect a narrow band of green light incident thereon. The properties of optical elements 340a–340c and 342a–342c enable fast switching between active and inactive states so that optical elements in group 330 may be quickly activated in succession with one optical element form group 332 being activated between activations of succeeding optical elements of group 330. Operated in this manner, optical system 312 of FIG. 20b can be use in a system 310 (see FIG. 18) that can image and display in visible color.

Figure 20C:
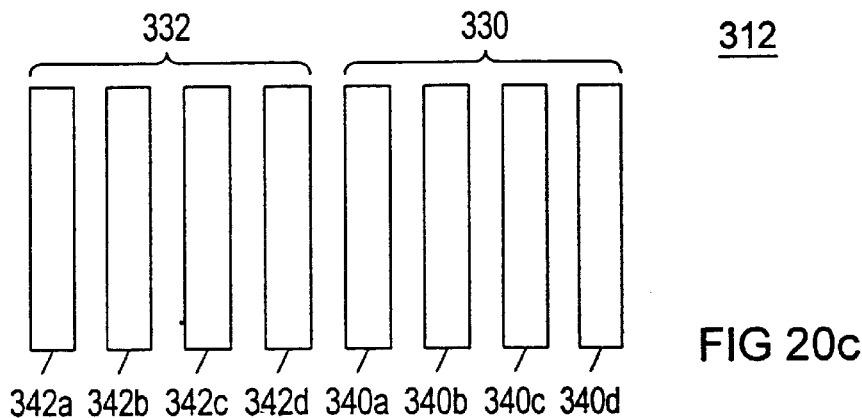

FIG. 20c shows a block diagram of optical system 312 with first and second groups 330 and 332, respectively, each having four optical elements. For example, first group 330 comprises four optical elements 340a–340d while second group 332 comprises four optical elements 342a–342d. Each of the optical elements 340a–340c is substantially similar to the optical elements 340a–340c shown in FIG. 20b. Optical element 340d is substantially similar to optical element 340 shown in FIG. 21. Thus, optical elements 340a–340c shown in FIG. 20c are optimized to converge the narrow bands of visible light when active, and optical element 340d is optimized to converge a narrow band of infrared light when active. Optical elements 342a–342c shown in FIG. 20c are substantially similar to optical elements 342a–342c shown in FIG. 20b. Optical element 342d shown in FIG. 20c is substantially similar to optical element 342 shown in FIG. 21. Thus, each of the optical elements 342a–342c shown in FIG. 20c is optimized to reflect a narrow band of visible light by diffraction when active. Optical element 342d shown as FIG. 20c is optimized to reflect monochrome light when active. Like the optical elements shown in FIG. 20b, the optical elements shown in FIG. 20c are each coupled to system controller 320 (not shown in FIG. 20c). In operation, system controller 320 operates to activate only one of the optical elements at a time while the remaining optical elements are deactivated. Optical system 312 shown in FIG. 20c can be employed in an imaging and display system which can be configured as either an infrared imaging and display system or a visible band color imaging and display system.

Figure 20D:
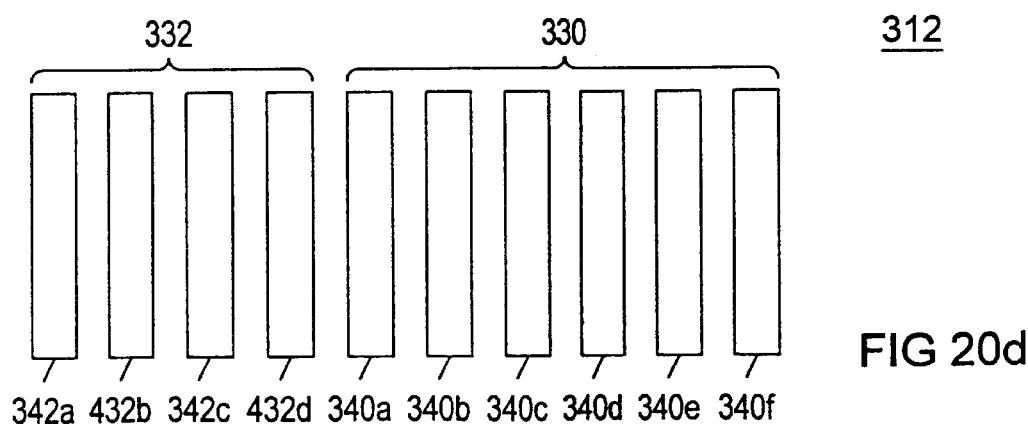

FIG. 20d shows an optical system 312 having a first group 330 and second group 332 with unequal numbers of optical elements. More particularly, first group 330 comprises six optical elements 340a–340f while second group 332 comprises four optical elements 342a–342d. In this embodiment, optical elements 340a–340d of FIG. 20d is substantially similar to optical elements 340a–340d shown in FIG. 20c. Additionally, optical elements 342a–342d of FIG. 20d are substantially similar to the optical elements 342a–342d of FIG. 20c. FIG. 20d adds additional optical elements 340e and 330f to first group 330. In this embodiments optical elements 340e and 430f operate substantially similar to optical element 340d. Namely, optical elements 340e and 340f operate in the active state to converge infrared light incident thereon. However, optical elements 340d–340f may differ by converging factors. More particularly, optical element 342f may focus infrared light incidence thereon at a different factor when compared to optical element 342d. Each optical element 340a–340f and 342a–342d shown in FIG. 20d is coupled to the system controller 320 (not shown in FIG. 20d). Unlike the systems shown in FIGS. 20a–20c, more than one optical element in FIG. 20d may be activated at any point in time by system controller 320. More particularly, optical elements 342d and 340f may be activated by system controller 320 while the remaining optical elements shown in FIG. 20d are deactivated. The effect of activating, for example, optical elements 342d and 340f concurrently is to converge infrared light at a focus factor which is a product of the individual focus factors of optical elements 342d and 340f. In essence, the system shown in FIG. 3d can operate as a solid state optical system which can focus light at multiple factors. Clearly, more complex optical operations can be performed by an imaging and display system 310 using the optical system 312 shown in FIG. 20*d* then an imaging and display system using any one of the optical systems shown in FIGS. 20*a*–20*c*.

It is noted that an imaging and display system 10 could be employed with a static optical system 312. For example, the system 312 shown in FIG. 20*b* may employ static optical elements 342*a*–342*c* and 340*a*–340*c* instead of the electrically switchable optical elements described above. Static optical elements defined by static volume holograms, however, suffer from optical cross talk. Optical elements defined by electrically switchable holograms are advantageous since they do not experience optical cross talk.

Figure 19A:
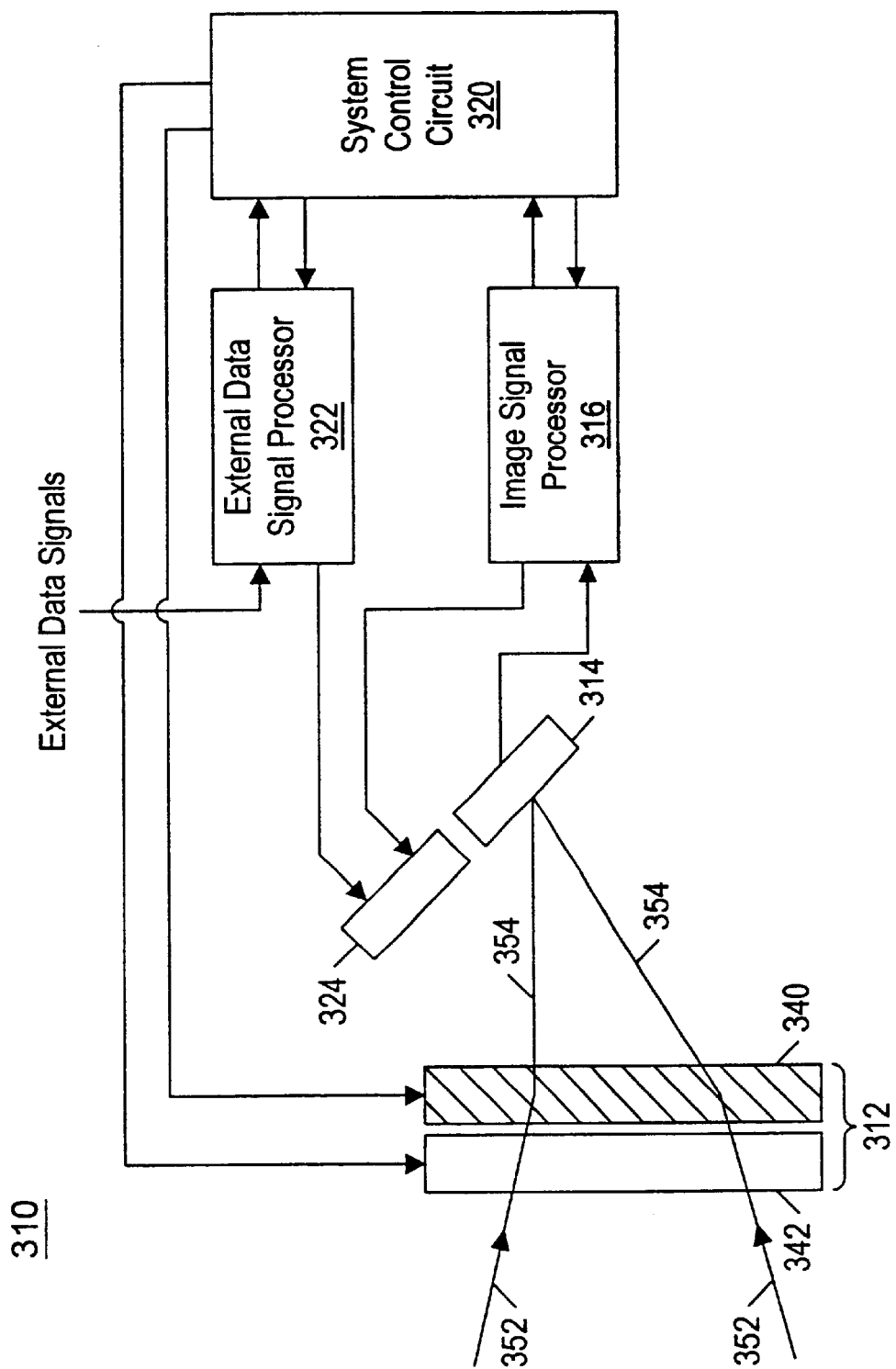
FIG. 19a is the image and display system shown in FIG. 18 operating in the imaging mode.
Figure 19B:
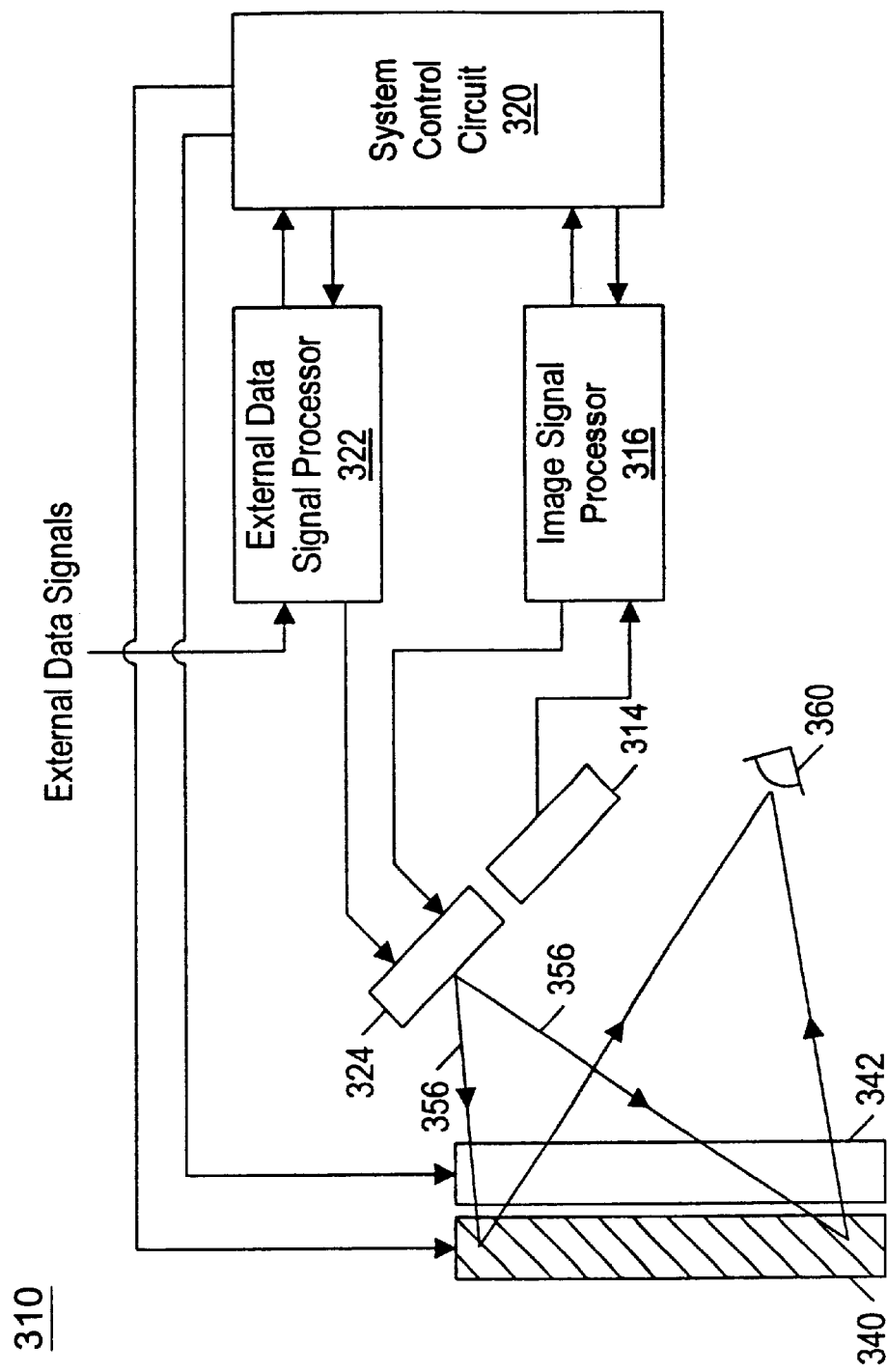
FIG. 19b is the image and display system shown in FIG. 18 operating in the display mode.

Turning to FIGS. 19*a* and 19*b*, operational aspects of the imaging and display system shown in FIG. 18 will now be described in further detail. FIG. 19*a* shows the imaging and display system 310 of FIG. 18 operating in the imaging mode while FIG. 19*b* shows the imaging and display system 310 of FIG. 18 operating in the display mode.

System 310 alternates rapidly between the imaging and display modes to enable real time imaging and display of external scenes for a system user. The imaging and display system 310 shown in FIG. 18 may use any one of the optical systems shown in FIGS. 20*a*–20*d*. However, it is to be noted that other optical systems may be employed in FIG. 18.

FIGS. 19*a* and 19*b* will now be described with respect to the imaging and display system 310 shown in FIG. 18 employing the optical system 312 shown in FIG. 20*a*. In FIG. 19*a*, image light 352 from an external scene falls incident upon optical element 342. As noted above, optical element 342 and optical element 340 are controlled by system control circuit 320. In the imaging mode, optical element 342 is rendered inactive while optical element 340 is on or activated. Accordingly, broad band image scene light 352 transmits through optical element 342 substantially unaltered. However, optical element 340, in this embodiment, operates to pass and converge narrow band infrared light 354 of an external scene. Sensor array 314 is positioned at the focal surface of the infrared image light 354 transmitted through optical element 340.

Sensor array 314 in one embodiment may comprise an array of charge couple devices (CCD). Alternatively, sensor array 314 may comprise an array of photocapacitors or photodiodes or any other devices configured to convert light incident thereon into corresponding analog signals. The sensor array 314 in the example shown in FIG. 19*a* is optimized to convert the infrared image light 354 into a frame of electrical signals. However, it is to be noted that sensor array 314 can be optimized to sense any select band of light incident thereon. Moreover, image sense array 314 may comprise a set of arrays each one of which is optimized for a particular bandwidth so that light of different bandwidths passing through optical system 312 at different times, may be detected by sensor array 314. Lastly, sensor array 314 may or may not have circuitry connected therein for routing, preprocessing or converting the analog frame of signals into digital equivalents.

Image signal processor 316 is configured to receive a frame of image signals generated by sensor array 314. If the signals are in analog form, image signal processor 316, using an analog to digital converter, converts the analog signals into digital equivalents. Image signal processor may comprise a digital signal processor executing embedded software. In one embodiment, image signal processor 316 preconditions the frame of signals received from sensor array 314 for subsequent display using light source 324 and optical element 342. Image signal processor 316 may perform a range of functions such as contrast enhancement, feature extraction, or insertion of computer generated data into the display light generated by the light source 324. Additionally, image signal processor 316 may filter fixed pattern or random pattern noise from the frame of signals received from sensor array 314. Image signal processor 316 begins processing the frame of electrical signals in accordance with the control signal provided by system control circuit 320. Upon completion, image signal processor 316 provides system control circuit with a processor complete signal.

As noted above FIG. 19*b* shows system 310 of FIG. 18 operating in the display mode. Upon receiving the process complete signal from image signal processor 316, system control circuit 320 deactivates optical element 340 and activates optical element 342. System control circuit 320 also directs image signal processor 316 to provide the processed frame of electrical signals to light source 324. In response to receiving the frame of signals, light source 324 generates a display frame of monochrome light. In one embodiment, light source 324 may comprise a liquid crystal display. It is to be understood that light source 324 may comprise any device capable of converting a frame of electrical signals into corresponding frames of electro illuminance. It is further noted that the need for having a separate light source 324 and a separate sensor array 314 could be removed by using a display that has photosensitive elements interspersed among light emitting display elements.

Light source 324 is positioned such that monochrome image light 356 emanating therefrom falls on deactivated optical element 340. Since optical element 340 is deactivated, the monochrome light incident thereon is transmitted therethrough to activated optical element 342 substantially unaltered. However, activated optical element 342 operates to reflect the monochrome image light 356, the reflected light passing back through optical element 340 substantially unaltered to a user at viewpoint 360. It is noted that optical element may also alter light reflected therefrom to adjust the field of view provided to the user at viewpoint 360. In the display mode shown in FIG. 19*b*, a user using the system at viewpoint 360 observes a monochrome display of the infrared light of the external scene imaged during the imaging mode described with reference to FIG. 19*a*. In other words, the image captured during imaging mode is displayed during display mode.

In the display mode shown in FIG. 19*b*, system 310 may optionally operate to superimpose a display frame of symbology onto the display frame of the captured image. For example, when system 310 is used in avionics applications, a display frame containing flight information such as air speed and altitude, may be superimposed upon an image frame captured during image mode. External data signal processor 322 is configured to generate a frame of electrical signals corresponding to the display symbology. More particularly, external data signal processor 322 may receive one or more external data signals corresponding to, for example, flight information. External data signal processor 322 may comprise a digital signal processor with embedded software. In response to receiving the external data signals, external data signal processor generates a frame of electrical signals to be provided to light source 324. Light source 324 upon receiving the frame of symbology signals, generates a frame of light corresponding thereto.

System control circuit 320 controls operation of the external data signal processor 322 in addition to the image signal processor 316 so that frames of symbology and image light can be displayed alternatively in rapid fashion. Accordingly, after image signal processor forwards its frame of processed image signals to light source 324, system control circuit 320 directs external data through node processor 322 to forward a frame of symbology signals to light source 324. Accordingly, light source 324 generates a frame of image light followed by a frame of symbology light. Light source 324 alternately generates frames of image light and frames of symbology light so that the alternating frames appear integrated to a user at viewpoint 360.

Figure 22:
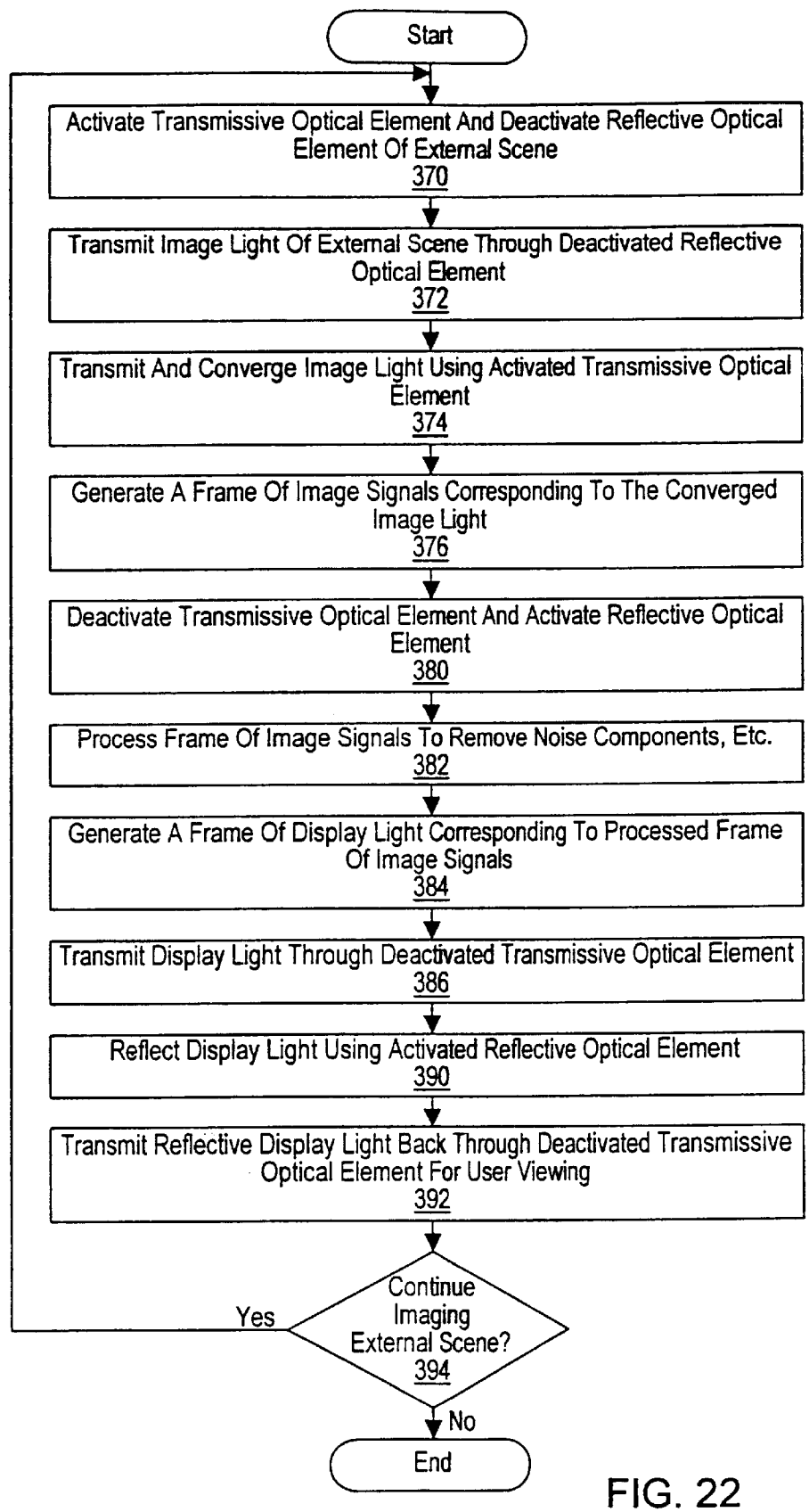
FIG. 22 is a flow chart illustrating operational aspects of the system shown in FIG. 18.

FIG. 22 is a flow chart illustrating the imaging and display modes of the system as described with reference to FIGS. 19a and 19b. In step 370, system control circuit 320 activates optical element 340 and deactives optical element 342. At step 372, image light from an external scene transmits through deactivated element 342 substantially unaltered. At step 380, activated element 340 converges a narrow band of image light transmitted through optical element 342. At step 376, image light converged by activated optical element 340 is converted into a frame of image signals by sensor array 342. Thereafter, system control circuit 320 deactivates optical element 340 and activates optical element 342 as shown in step 380. Image signal processor 316 processes the frame of image signals generated by sensor array 314 as shown in step 382. The processed frame of image signals is provided to light source 324 where it is converted into a frame of display light as shown in step 384. The generated frame of image light is transmitted substantially unaltered through deactivated optical element 340. However, with optical element 342 activated, optical element 342 operates to reflect the generated frame of image light back through deactivated optical element 340 to a viewpoint of a system user as shown in steps 386–392. If the system is to continue imaging, then the process returns to step 370 whereby system control circuit 320 activates optical element 342 and deactivates optical element 340 to enable imaging mode.

Figure 23:
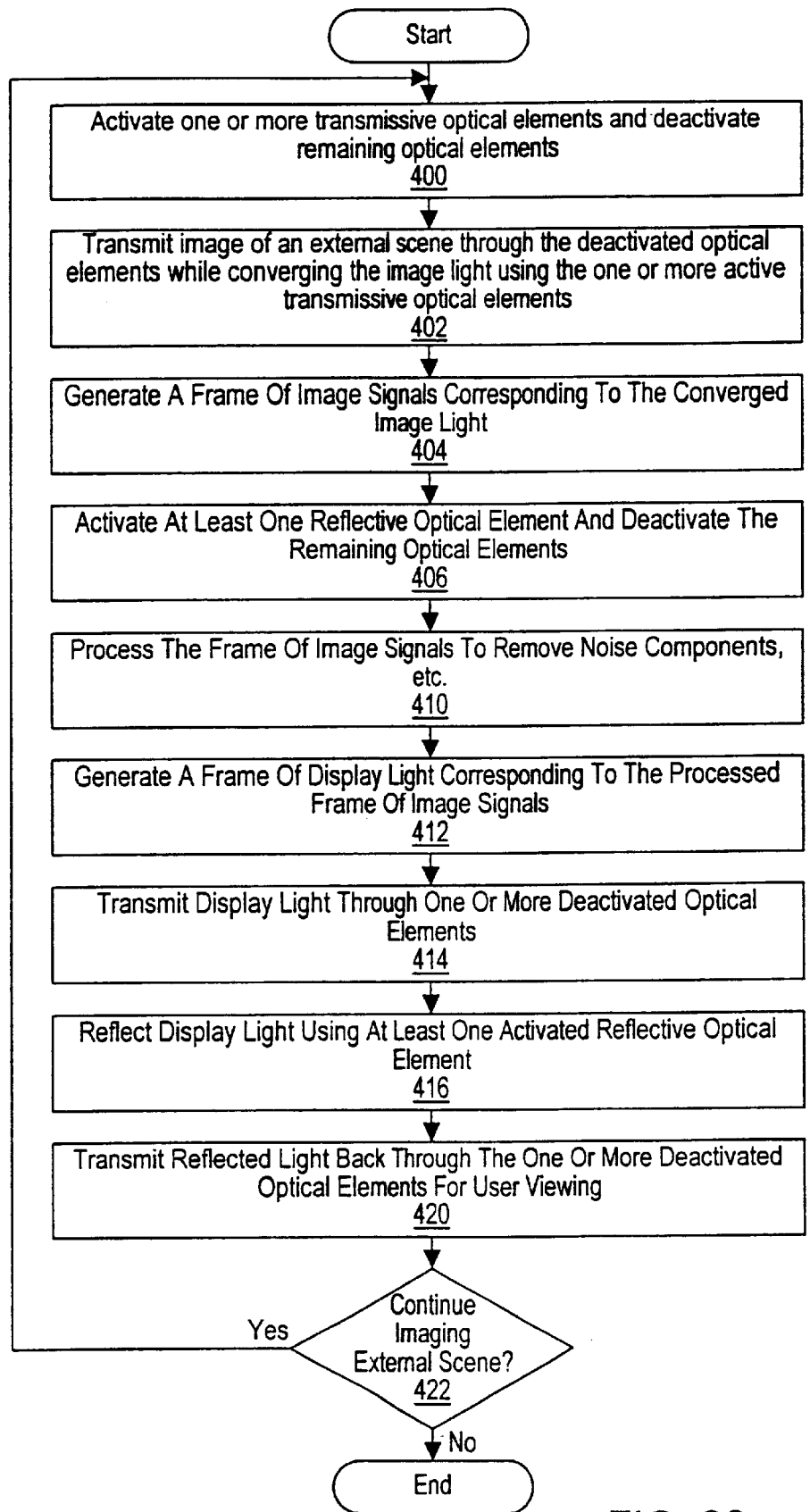
FIG. 23 is a flow chart illustrating operational aspects of the system shown in FIG. 18.

FIG. 23 is a flow chart illustrating operational aspects of the image and display system shown in FIG. 18 with multiple optical elements within first and second groups 330 and 332. In step 400, system control circuit 320 activates one or more of the optical elements within group 330 while deactivating all remaining optical elements within groups 330 and 332. In step 402, image light from an external scene is transmitted substantially unaltered through the deactivated optical elements of group 332 while the one or more activated optical elements of group 330 operates to converge a select band of light onto sensor array 314. In step 404, sensor array 34 generates a frame of image signals corresponding to the converged band of light. Thereafter, system control circuit 320 activates at least one optical element within group 332 while deactivating the remaining optical elements within system 112. The frame signals generated by sensor array 314 is processed by image signal processor 316 as shown in step 410. The processed frame of signals is provided to light source 324 which in turn generates a frame of display light in response thereto as shown in step 412. The frame of display light generated by light source 324 passes substantially unaltered through the optical elements deactivated in group 110. However, the light transmitted through optical elements of group 330 is reflected and possibly magnified by one or more optical elements of group 332 activated by system control circuit 320 as shown in step 416. The reflected and possibly magnified display light is transmitted back through deactivated optical elements of group 330 again, substantially unaltered, to a viewpoint of a user of optical system 310 as shown in step 420. If the system is to continue imaging and displaying external scenes, then the process returns to step 400 as shown in step 422.

While the present invention has been described with reference to particular embodiments, it will be understood that the embodiments are illustrated and that the invention scope is not so limited. Any variations, modifications, additions and improvements to the embodiments described are possible. These variations, modifications, additions and improvements may fall within the scope of the invention as detailed within the following claims.

What is claimed is:

1. An apparatus comprising:

an array of light sensors a first electrically switchable holographic optical element (ESHOE) configured to operate between active and inactive states, wherein the first ESHOE is configured to transmit first image light without substantial alteration when the first ESHOE operates in the inactive state, and wherein the first ESHOE is configured to diffract first image light when the first ESHOE operates in the active state, wherein first image light diffracted by the first ESHOE is received by the array of light sensors, and wherein the array of light sensors are configured to generate electrical signals in response to receiving first image light diffracted by the first ESHOE;

a first processing circuit in data communication with the array of light sensors, wherein the first processing circuit is configured to receive and process electrical signals generated by the array of light sensors;

an image display in data communication with the first processing circuit, wherein the image display is configured to receive the processed electrical signals from the first processing circuit, and wherein the image display is configured to generate second image light in response to receiving the processed electrical signals;

a second ESHOE configured to operate between active and inactive states, wherein the second ESHOE is configured to receive the second image light from the image display, wherein the second ESHOE is configured to transmit second image light received from the image display without substantial alteration when the second ESHOE operates in the inactive state, and wherein the second ESHOE is configured to diffract the second image light received from the image display when the second ESHOE operates in the active state.

2. The apparatus of claim 1, wherein the second ESHOE comprises oppositely facing front and back surfaces, wherein the front surface is configured to receive the second image light from the image display, and wherein second image light diffracted by the second ESHOE emerges from the front surface thereof.

3. The apparatus of claim 1, wherein the first ESHOE comprises oppositely facing front and back surfaces, wherein the front surface of the first ESHOE is configured to receive the first image light, and wherein first image light diffracted by the first ESHOE emerges from the back surface thereof.

4. The apparatus of claim 1, wherein the first and second ESHOEs are coupled to the first processing circuit, wherein the first processing circuit is configured to selectively activate the first and second ESHOEs so that the first ESHOE is active when the second ESHOE is inactive and the first ESHOE is inactive when the second ESHOE is active.

5. The apparatus of claim 1, wherein the image display comprises a liquid crystal display.

* * * * *